United States Patent
Feldman et al.

(10) Patent No.: US 11,815,470 B2
(45) Date of Patent: Nov. 14, 2023

(54) MULTI-PERSPECTIVE WAFER ANALYSIS

(71) Applicant: Applied Materials Israel, Ltd., Revohot (IL)

(72) Inventors: Haim Feldman, Nof-Ayalon (IL); Eyal Neistein, Herzlyia (IL); Harel Ilan, Rehovot (IL); Shahar Arad, Holon (IL); Ido Almog, Rehovot (IL); Ori Golani, Ramat-Gan (IL)

(73) Assignee: Applied Materials Israel, Ltd., Revohot (IL)

( * ) Notice: Subject to any disclaimer, the term of this patent is extended or adjusted under 35 U.S.C. 154(b) by 322 days.

(21) Appl. No.: 17/010,746

(22) Filed: Sep. 2, 2020

(65) Prior Publication Data
US 2020/0400589 A1     Dec. 24, 2020

Related U.S. Application Data

(63) Continuation-in-part of application No. 16/746,739, filed on Jan. 17, 2020, now abandoned, which is a continuation-in-part of application No. 16/250,980, filed on Jan. 17, 2019, now Pat. No. 10,902,582.

(51) Int. Cl.
*G06K 9/00* (2022.01)
*G01N 21/95* (2006.01)
*G06T 7/00* (2017.01)

(52) U.S. Cl.
CPC ......... *G01N 21/9505* (2013.01); *G06T 7/001* (2013.01); *G06T 7/0008* (2013.01); *G06T 2207/30148* (2013.01)

(58) Field of Classification Search
CPC ........... G01N 21/9505; G01N 21/9501; G01N 21/95684; G06T 7/0008; G06T 7/001; G06T 2207/30148; G06T 7/0004
See application file for complete search history.

(56) References Cited

U.S. PATENT DOCUMENTS

| | | | |
|---|---|---|---|
| 7,283,659 B1 * | 10/2007 | Bakker | ............... G06K 9/6272 382/145 |
| 9,194,817 B2 | 11/2015 | Sugihara et al. | |
| 9,625,726 B2 | 4/2017 | Chen | |

(Continued)

FOREIGN PATENT DOCUMENTS

| | | |
|---|---|---|
| CN | 106600600 A1 | 4/2017 |
| CN | 106650770 A1 | 5/2017 |

(Continued)

OTHER PUBLICATIONS

International Search Report and Written Opinion of International Application No. PCT/US2021/048935 dated Dec. 20, 2021, 12 pages.

(Continued)

*Primary Examiner* — Samir A Ahmed
(74) *Attorney, Agent, or Firm* — Lowenstein Sandler LLP

(57) ABSTRACT

Disclosed herein is a method for detecting defects on a sample. The method includes obtaining scan data of a region of a sample in a multiplicity of perspectives, and performing an integrated analysis of the obtained scan data. The integrated analysis includes computing, based on the obtained scan data, and/or estimating cross-perspective covariances, and determining presence of defects in the region, taking into account the cross-perspective covariances.

17 Claims, 9 Drawing Sheets

(56) References Cited

U.S. PATENT DOCUMENTS

| | | | |
|---|---|---|---|
| 9,880,107 B2 | 1/2018 | Chen et al. | |
| 11,195,267 B1* | 12/2021 | Ilan | G01N 21/9501 |
| 2010/0110420 A1* | 5/2010 | Judell | G01N 21/55 |
| | | | 356/237.2 |
| 2010/0188657 A1* | 7/2010 | Chen | G01N 21/9501 |
| | | | 356/237.5 |
| 2012/0141012 A1 | 6/2012 | Sakai | |
| 2012/0229618 A1 | 9/2012 | Urano | |
| 2012/0294507 A1 | 11/2012 | Sakai et al. | |
| 2013/0250287 A1* | 9/2013 | Chen | G01N 21/9501 |
| | | | 356/237.5 |
| 2014/0132752 A1* | 5/2014 | Edgar | H04N 5/253 |
| | | | 348/97 |
| 2014/0219544 A1* | 8/2014 | Wu | G01N 21/8806 |
| | | | 382/149 |
| 2017/0148226 A1 | 5/2017 | Zhang | |
| 2017/0292918 A1 | 10/2017 | Kolchin et al. | |
| 2019/0238796 A1 | 8/2019 | Allen | |
| 2020/0232934 A1 | 7/2020 | Feldman et al. | |

FOREIGN PATENT DOCUMENTS

| | | |
|---|---|---|
| CN | 107845087 A | 3/2018 |
| KR | 10-2011-0118623 A | 10/2011 |
| KR | 10-2018-010211 A | 9/2018 |
| WO | 2013155008 A1 | 10/2013 |

OTHER PUBLICATIONS

International Search Report and Written Opinion of International Application No. PCT/US2020/013555 dated May 6, 2020.
Taiwan Office Action of Taiwan Application No. 109101688 dated Jun. 21, 2023 14 pages.

* cited by examiner

Multiplying a first vector v, including difference values corresponding to a sub-region, by the inverse of a covariance matrix C to obtain a second vector u.  — 320c1

Taking the scalar product of the second vector u and a third vector k (e.g. a predetermined kernel) whose components include values characterizing a defect(s) the sub-region is suspected of including.  — 320c2

Checking whether the scalar product k · u exceeds a predetermined threshold $B$, and, if k · u > $B$, labeling the sub-region as potentially including a defect.  — 320c3

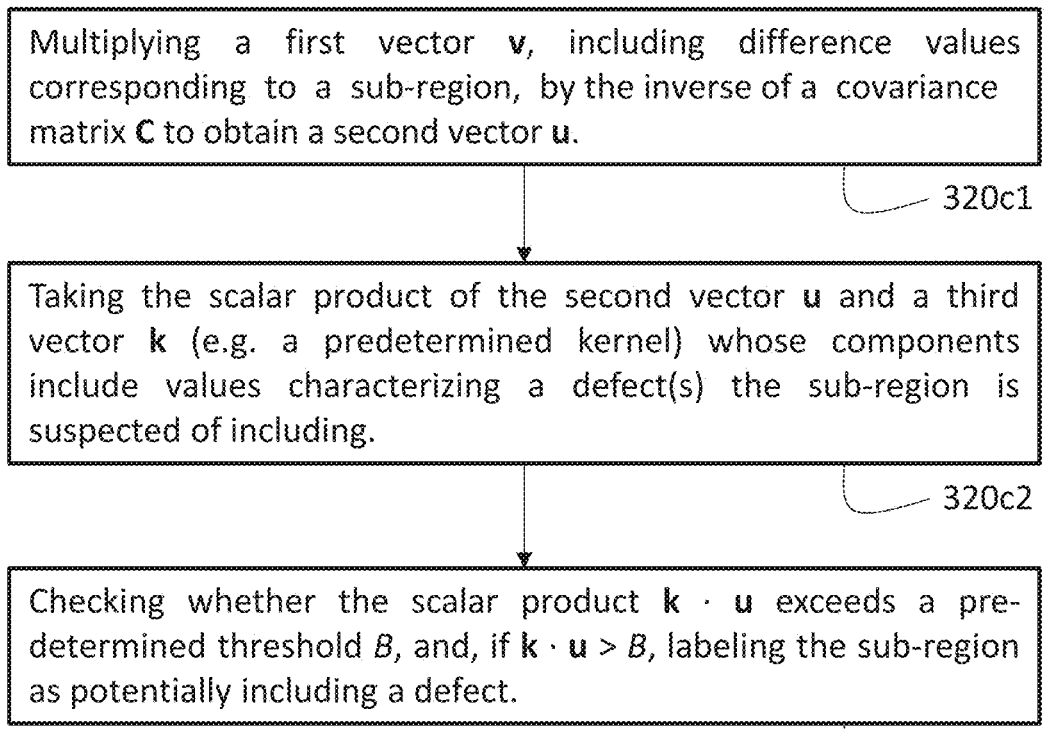

Fig. 4A

Fig. 4B $$\mathbf{c}_{ab} = \begin{pmatrix} c_{a1b1} & c_{a1b2} & \cdots & c_{a1bn} \\ c_{a2b1} & c_{a2b2} & \cdots & c_{a2bn} \\ \vdots & \vdots & \cdots & \vdots \\ c_{anb1} & c_{anb2} & \cdots & c_{anbn} \end{pmatrix}$$

Fig. 4D $$\mathbf{C} = \begin{pmatrix} c_{11} & 0 & 0 \\ 0 & c_{22} & 0 \\ 0 & 0 & c_{33} \end{pmatrix}$$

Fig. 4G $$\mathbf{C} = \begin{pmatrix} c_{11} & c_{12} & \cdots & c_{1m} \\ c_{21} & c_{22} & \cdots & c_{2m} \\ \vdots & \vdots & \cdots & \vdots \\ c_{m1} & c_{m2} & \cdots & c_{mm} \end{pmatrix}$$

Fig. 4C $$\mathbf{k}_j = \begin{pmatrix} k_{j1} & k_{j2} & \cdots & k_{jn} \end{pmatrix}$$

Fig. 4F $$\mathbf{k} = \begin{pmatrix} \mathbf{k}_1 & \mathbf{k}_2 & \cdots & \mathbf{k}_n \end{pmatrix} = \begin{pmatrix} k_{11} & k_{12} & \cdots & k_{1n} & k_{21} & \cdots & k_{2n} & \cdots & k_{m1} & \cdots & k_{mn} \end{pmatrix}$$

Fig. 4E

MULTI-PERSPECTIVE WAFER ANALYSIS

RELATED APPLICATIONS

This application is a continuation-in-part application of co-pending U.S. patent application Ser. No. 16/746,739, filed Jan. 17, 2020, which is a continuation-in-part application of co-pending U.S. patent application Ser. No. 16/250,980, filed Jan. 17, 2019, the contents of which are herein incorporated by reference.

TECHNICAL FIELD

The present disclosure relates generally to wafer analysis.

BACKGROUND

As design rules shrink, wafer analysis tools are accordingly required to detect increasingly smaller defects. Previously, defect detection was mainly limited by laser power and detector noise. Currently, state-of-the-art wafer analysis tools are mostly limited by wafer noise due to diffuse reflection from the surface of the wafer: Surface irregularities on the wafer, constituted by the roughness of the etched patterns, are often manifested as bright spots (speckles) in a scanned image. These bright spots may highly resemble the "thumbprint" (signature) of a defect. There is thus a need for improved techniques of distinguishing defects from wafer noise.

SUMMARY

Aspects of the disclosure, according to some embodiments thereof, relate to methods and systems for wafer analysis. More specifically, but not exclusively, aspects of the disclosure, according to some embodiments thereof, relate to methods and systems for multi-perspective wafer analysis wherein measurement data from a plurality of perspectives are subjected to an integrated analysis.

Thus, according to an aspect of some embodiments, there is provided a method for detecting defects on a sample (e.g. a wafer or an optical mask). The method includes:
Obtaining scan data of a first region (e.g. on a surface) of a sample in a multiplicity of perspectives.
Performing an integrated analysis of the obtained scan data. The integrated analysis includes:
Computing, based on the obtained scan data, cross-perspective covariances (i.e. covariances between different perspectives), and/or estimating the cross-perspective covariances.
Determining presence of defects in the first region, taking into account the cross-perspective covariances.

According to some embodiments of the method, the sample is a patterned wafer.

According to some embodiments of the method, the sample is a bare wafer.

According to some embodiments of the method, the multiplicity of perspectives includes two or more of an incidence angle(s) of an irradiating beam(s), a collection angle(s) of a collected beam(s), at least one intensity of the irradiating beam(s), at least one intensity of the collected beam(s), and compatible combinations thereof.

According to some embodiments of the method, the method is optical-based, scanning electron microscopy-based, and/or atomic force microscopy-based.

According to some embodiments of the method, the method is optical-based and the multiplicity of perspectives includes two or more of an illumination angle(s), an intensity of the illuminating radiation, an illumination polarization, an illumination wavefront, an illumination spectrum, one or more focus offsets of the illuminating light beam, a collection angle(s), an intensity of the collected radiation, a collection polarization, a phase of the collected beam(s), brightfield channel, grayfield channel, Fourier filtering of returned light, and a sensing type selected from intensity, phase, or polarization, and compatible combinations thereof.

According to some embodiments of the method, the integrated analysis includes:
For each of a plurality of sub-regions of the first region, generating difference values in each of the multiplicity of perspectives based on the obtained scan data and corresponding reference data of the first region in each of the multiplicity of perspectives. (That is, a set of difference values is generated, wherein each difference value in the set corresponds to a different perspective.)
Determining whether each of the plurality of sub-regions is defective, based at least on the difference values corresponding to the sub-region and to sub-regions neighboring the sub-region, and noise values (i.e. a set of noise values) corresponding to the sub-region and to the neighboring sub-regions. The noise values include corresponding covariances from the cross-perspective covariances.

According to some embodiments of the method, the method further includes generating difference images of the first region in each of the multiplicity of perspectives, based on the obtained scan data and the reference data. The difference values corresponding to each sub-region, from the plurality of sub-regions, are derived from, and/or characterize, sub-images of the difference images, which correspond to the sub-region. (So that given N difference images, to each sub-region correspond N sub-images (i.e. a set of N sub-images). More specifically, to each sub-region correspond N sub-images—one sub-image per each of the N difference images—and N corresponding difference values.)

According to some embodiments of the method, the noise values are computed based at least on the difference values.

According to some embodiments of the method, the determining of whether each of the plurality of sub-regions is defective includes:
Generating a covariance matrix, which includes the noise values corresponding to the sub-region and the sub-regions neighboring the sub-region.
Multiplying a first vector, which includes the difference values corresponding to the sub-region and the neighboring sub-regions, by the inverse of the covariance matrix, to obtain a second vector.
Computing a scalar product of the second vector and a third vector, whose components include values characterizing a defect(s).
Labeling (designating) the sub-region as defective if the scalar product is greater than a predetermined threshold.

According to some embodiments of the method, at least one of the plurality of sub-regions is of a size corresponding to a single (image) pixel.

According to some embodiments of the method, the cross-perspective covariances are estimated based at least on scan data obtained in a preliminary scanning of the sample wherein regions (e.g. on the surface) of the sample are sampled. Each sampled region is representative of a group of regions of the sample, with at least one of the sampled regions being representative of the first region.

According to some embodiments of the method, the method further includes, when a presence of a defect is determined, determining whether the defect is a defect of interest and, optionally, when the defect is determined to be of interest, classifying the defect.

According to some embodiments of the method, the method is repeated with respect to each of a plurality of additional regions, such as to scan a greater region (e.g. on the surface of) of the sample formed by the first region and the additional regions.

According to an aspect of some embodiments, there is provided a computerized system for obtaining and analyzing multi-perspective scan data of a sample (e.g. a wafer or an optical mask). The computerized system is configured to implement the above-described method.

According to an aspect of some embodiments, there is provided a non-transitory computer-readable storage medium storing instructions that cause a computerized analysis system (e.g. a wafer analysis system) to implement the above-described method.

According to an aspect of some embodiments, there is provided computerized system for obtaining and analyzing multi-perspective scan data of a sample. The system includes:
   Scanning equipment configured to scan a region (e.g. on a surface) of a sample in a multiplicity of perspectives.
   A scan data analysis module (including one or more processors and memory components) configured to perform an integrated analysis of scan data obtained in the scan, wherein the integrated analysis includes:
      Computing, based on the obtained scan data, and/or estimating cross-perspective covariances.
      Determining presence of defects in the region, taking into account the cross-perspective covariances.

According to some embodiments of the system, the system is configured for analyzing scan data of a patterned wafer.

According to some embodiments of the system, the system is configured for analyzing scan data of a bare wafer.

According to some embodiments of the system, the multiplicity of perspectives includes two or more of an incidence angle(s) of an irradiating beam(s), a collection angle(s) of a collected beam(s), at least one intensity of the irradiating beam(s), and at least one intensity of the collected beam(s).

According to some embodiments of the system, the scanning equipment includes an optical-based imager.

According to some embodiments of the system, the scanning equipment includes a scanning electron microscope.

According to some embodiments of the system, the scanning equipment includes an atomic force microscope.

According to some embodiments of the system, the multiplicity of perspectives includes two or more of an illumination angle(s), an intensity of the illuminating radiation, an illumination polarization, an illumination wavefront, an illumination spectrum, one or more focus offsets of the illuminating light beam, a collection angle(s), an intensity of the collected radiation, a collection polarization, a phase of the collected beam(s), brightfield channel, grayfield channel, Fourier filtering of returned light, and a sensing type selected from intensity, phase, or polarization, and compatible combinations thereof.

According to some embodiments of the system, the integrated analysis includes:
   For each of a plurality of sub-regions of the first region, generating difference values in each of the multiplicity of perspectives based on the obtained scan data and corresponding reference data of the first region in each of the multiplicity of perspectives.
   Determining whether each of the plurality of sub-regions is defective, based at least on the difference values corresponding to the sub-region and to sub-regions neighboring the sub-region, and noise values corresponding to the sub-region and to the neighboring sub-regions. The noise values include corresponding covariances from the cross-perspective covariances.

According to some embodiments of the system, the scan data analysis module is further configured to generate difference images of the first region in each of the multiplicity of perspectives based on the obtained scan data and the reference data, wherein the difference values corresponding to each sub-region, from the plurality of sub-regions, are derived from, and/or characterize, sub-images of the difference images, which correspond to the sub-region.

According to some embodiments of the system, the scan data analysis module is configured to compute the noise values based at least on the difference values.

According to some embodiments of the system, the determining of whether each of the plurality of sub-regions is defective includes:
   Generating a covariance matrix, which includes the noise values corresponding to the sub-region and the sub-regions neighboring the sub-region.
   Multiplying a first vector, which includes the difference values corresponding to the sub-region and the neighboring sub-regions, by the inverse of the covariance matrix, to obtain a second vector.
   Computing a scalar product of the second vector and a third vector, whose components include values characterizing a defect(s).
   Labeling the sub-region as defective if the scalar product is greater than a predetermined threshold.

According to some embodiments of the system, at least one of the plurality of sub-regions is of a size corresponding to a single (image) pixel.

According to some embodiments of the system, the scan data analysis module is configured to estimate the cross-perspective covariances based at least on scan data obtained in a preliminary scanning of the sample wherein regions (e.g. on the surface) of the sample are sampled. Each sampled region is representative of a group of regions of the sample, with at least one of the sampled regions being representative of the first region.

According to some embodiments of the system, the scan data analysis module is further configured to, upon determining a presence of a defect, further determining whether the defect is a defect of interest and, optionally, when the defect is determined to be of interest, classifying the defect.

According to some embodiments of the system, the system is further configured to repeat the scanning and the integrated analysis with respect to each of a plurality of additional regions, such as to scan a greater region (e.g. on the surface) of the sample formed by the first region and the additional regions.

According to an aspect of some embodiments, there is provided a non-transitory computer-readable storage medium storing instructions that cause a computerized analysis system (e.g. a wafer analysis system) to:
   Scan a region (e.g. on the surface) of a sample (e.g. a wafer or an optical mask) in a multiplicity of perspectives.

Perform an integrated analysis of scan data obtained in the scan, the integrated analysis including:
Computing, based on the obtained scan data, and/or estimating cross-perspective covariances.
Determining presence of defects in the region, taking into account the cross-perspective covariances.

According to some embodiments of the storage medium, the sample is a patterned wafer.

According to some embodiments of the storage medium, the sample is a bare wafer.

According to some embodiments of the storage medium, the multiplicity of perspectives includes two or more of an incidence angle(s) of an irradiating beam(s), a collection angle(s) of a collected beam(s), at least one intensity of the irradiating beam(s), and at least one intensity of the collected beam(s).

According to some embodiments of the storage medium, the computerized analysis system is optical-based.

According to some embodiments of the storage medium, the computerized analysis system scanning is electron microscopy-based or atomic force microscopy-based.

According to some embodiments of the storage medium, the multiplicity of perspectives includes two or more of an illumination angle(s), an intensity of the illuminating radiation, an illumination polarization, an illumination wavefront, an illumination spectrum, one or more focus offsets of the illuminating light beam, a collection angle(s), an intensity of the collected radiation, a collection polarization, a phase of the collected beam(s), brightfield channel, grayfield channel, Fourier filtering of returned light, and a sensing type selected from intensity, phase, or polarization, and compatible combinations thereof.

According to some embodiments of the storage medium, the integrated analysis includes:
For each of a plurality of sub-regions of the first region, generating difference values in each of the multiplicity of perspectives based on the obtained scan data and corresponding reference data of the first region in each of the multiplicity of perspectives.
Determining whether each of the plurality of sub-regions is defective, based at least on the difference values corresponding to the sub-region and to sub-regions neighboring the sub-region, and noise values corresponding to the sub-region and to the neighboring sub-regions. The noise values include corresponding covariances from the cross-perspective covariances.

According to some embodiments of the storage medium, the stored instructions cause a scan data analysis module of the computerized system to generate difference images of the first region in each of the multiplicity of perspectives based on the obtained scan data and the reference data, wherein the difference values corresponding to each sub-region, from the plurality of sub-regions, are derived from, and/or characterize, sub-images of the difference images, which correspond to the sub-region.

According to some embodiments of the storage medium, the stored instructions cause the scan data analysis module to compute the noise values based at least on the difference values.

According to some embodiments of the storage medium, the determining of whether each of the plurality of sub-regions is defective includes:
Generating a covariance matrix, which includes the noise values corresponding to the sub-region and the sub-regions neighboring the sub-region.
Multiplying a first vector, which includes the difference values corresponding to the sub-region and the neighboring sub-regions, by the inverse of the covariance matrix, to obtain a second vector.
Computing a scalar product of the second vector and a third vector, whose components include values characterizing a defect(s).
Labeling the sub-region as defective if the scalar product is greater than a predetermined threshold.

According to some embodiments of the storage medium, at least one of the plurality of sub-regions is of a size corresponding to a single (image) pixel.

According to some embodiments of the storage medium, the stored instructions cause the scan data analysis module to estimate the cross-perspective covariances based at least on scan data obtained in a preliminary scanning of the sample wherein regions (e.g. on the surface) of the sample are sampled. Each sampled region is representative of a group of regions of the sample, with at least one of the sampled regions being representative of the first region.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

Unless specifically stated otherwise, as apparent from the disclosure, it is appreciated that, according to some embodiments, terms such as "processing", "computing", "calculating", "determining", "estimating", "assessing", "gauging" or the like, may refer to the action and/or processes of a computer or computing system, or similar electronic computing device, that manipulate and/or transform data, represented as physical (e.g. electronic) quantities within the computing system's registers and/or memories, into other data similarly represented as physical quantities within the computing system's memories, registers or other such information storage, transmission or display devices.

Embodiments of the present disclosure may include apparatuses for performing the operations herein. The apparatuses may be specially constructed for the desired purposes or may include a general-purpose computer(s) selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method(s). The desired structure(s) for a variety of these systems appear from the description below. In addition, embodiments of the present disclosure are not described with reference to any particular programming language. It will be appreciated that a variety of programming languages may be used to implement the teachings of the present disclosure as described herein.

Aspects of the disclosure may be described in the general context of computer-executable instructions, such as program modules, being executed by a computer. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

BRIEF DESCRIPTION OF THE FIGURES

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not drawn to scale. Moreover, two different objects in the same figure may be drawn to different scales. In particular, the scale of some objects may be greatly exaggerated as compared to other objects in the same figure.

In the figures:

FIG. 3 is a flowchart of a sub-operation for identifying (detecting) defects in a scanned region of a wafer, according to some specific embodiments of the operation of FIG. 2;

FIGS. 4A-4G present algebraic expressions used in computations included in the sub-operation of FIG. 3, according to some embodiments;

DETAILED DESCRIPTION

Figure 1:
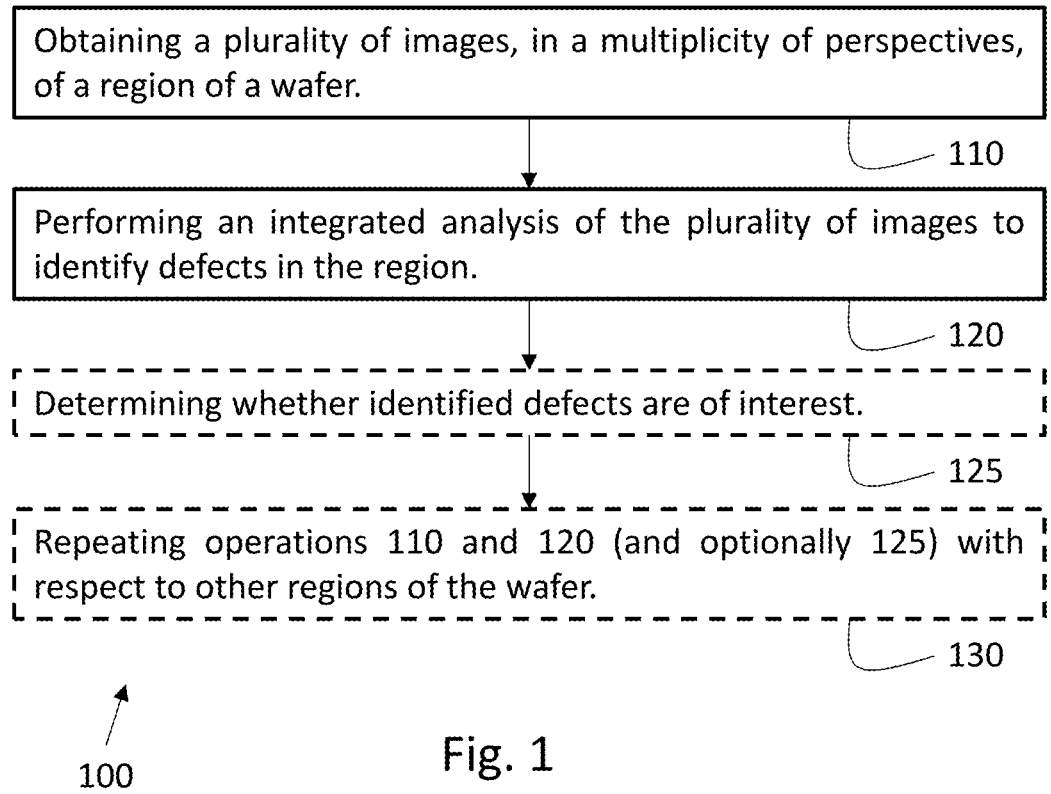
FIG. 1 is a flowchart of a method for multi-perspective wafer analysis, according to some embodiments.

The principles, uses, and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the description and claims of the application, the words "include" and "have", and forms thereof, are not limited to members in a list with which the words may be associated.

As used herein, the term "about" may be used to specify a value of a quantity or parameter (e.g. the length of an element) to within a continuous range of values in the neighborhood of (and including) a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value.

As used herein, according to some embodiments, the terms "substantially" and "about" may be interchangeable.

Referring to the figures, in flowcharts, optional operations may appear within boxes delineated by a dashed line.

As used herein, the term "multi-perspective wafer analysis" is used to refer to wafer analysis employing scan data from a multiplicity of perspectives. Different perspectives may differ from one another, for example, by polarization, collection pupil segment, phase information, focus offset, and so on. The extra information provided by the multiplicity of perspectives (as compared to by a single perspective) may be used, in particular, to cope more efficiently with wafer noise. Scan data from several perspectives may give rise to a predictable or self-learnable pattern, which is distinguishable from wafer noise, thus, leading to improved defect detection rates.

As used herein, according to some embodiments, the terms "identifying" and "detecting" and derivatives thereof, employed in reference to defects on e.g. a wafer, may be used interchangeably.

As used herein, according to some embodiments, the term "sample" may refer to a wafer or an optical mask. The wafer may be patterned or bare.

Methods

According to an aspect of some embodiments, there is provided a computer-implemented method for wafer analysis, wherein scan data from a multiplicity of perspectives is subjected to an integrated analysis (as defined and explained below). FIG. 1 presents a flowchart of such a method, a method 100, according to some embodiments.

According to some embodiments, method 100 includes an operation 110, wherein scan data in a multiplicity of perspectives of a region (area) of a wafer are obtained. More specifically, in operation 110 a plurality of images (e.g. image frames)—in a multiplicity of perspectives—of a scanned region (e.g. a segment of a slice corresponding to an image frame) of a wafer may be obtained. The plurality of images may be obtained using scanning equipment configured to scan a wafer in a multiplicity of perspectives, as elaborated on below. In particular, the scanning equipment may include an imager (imaging module or unit) configured to irradiate (e.g. illuminate) a region of a wafer and collect radiation therefrom. According to some embodiments, the imager may be optical-based (being configured to illuminate a region of a wafer with electromagnetic radiation, such as visible and/or ultraviolet (UV) radiation). According to some embodiments, the UV radiation may be or include deep UV radiation and/or extreme UV radiation. According to some embodiments, the imager may be configured to irradiate a region of a wafer with one or more charged-particle beams (e.g. electron beams).

According to some embodiments, the imager may be configured to allow simultaneously irradiating the wafer with a plurality of radiation beams, thereby facilitating simultaneously scanning a plurality of regions of the wafer.

Generally, perspectives can be classified into two groups: irradiation channel perspectives and collection channel perspectives. Broadly, an irradiation channel determines one or more physical properties of the irradiation beam incident on the wafer, such as the trajectory of the beam, the shape of the beam, and/or the polarization of the beam (when the beam is a light beam). In contrast, the collection channel includes sensing type (intensity, polarization, phase), as well as "filters", which are used herein in a broad sense to refer to mechanisms (e.g. segmented pupils, Fourier filters, polarizing beam splitters) configured to allow selectively collecting (and sensing) components of the radiation, returned from the wafer, which are characterized by certain physical properties, such as return (reflection, scattering) angle, intensity, and polarization (when the radiation is electromagnetic radiation).

According to some embodiments, wherein the imager is optical-based, the multiplicity of perspectives may include two or more of: an illumination angle(s) (i.e. the incidence angle(s) of the illuminating radiation), an illumination intensity (as determined by the amplitude of the illuminating radiation), an illumination polarization (i.e. the polarization of the illuminating radiation), an illumination wavefront (the shape of the wavefront of the illuminating radiation when monochromatic), an illumination spectrum (i.e. the spectrum of the illuminating radiation), and one or more focus offsets of the illuminating light beam (which may be slightly out-of-focus), a collection angle(s) (allowing to selectively sense light returned at certain angle or range of angles), an intensity of the collected radiation (allowing to selectively sense light returned at certain intensity or range of intensities), a collection polarization, a phase of the collected beam(s) (when the illumination beam(s) is monochromatic), brightfield channel, grayfield channel (which may be further subdivided into darkfield and "pure" grayfield), Fourier filtering of returned light, a sensing type (for example, amplitude, phase, and/or polarization), and compatible combinations of the above-listed items.

In particular, it is to be understood that a perspective may be characterized by more than one of the items from the above list. That is, a combination of items from the above list. For example, a perspective may be characterized by an angle at which the incident light beam impinges on the wafer surface (i.e. an illumination angle) and the polarization of the incident light beam (i.e. an illumination polarization). As another example, a perspective may be characterized by a collection angle and a collection phase (i.e. a phase of a collected light beam). Further, it is to be understood that a perspective may combine characteristics from both the illumination channels and the collection channels. For example, a perspective may be characterized by an illumination polarization and a collection polarization. As another example, a perspective may be characterized by an illumination angle and polarization and a collection intensity and phase.

Thus, acquired (obtained) images may differ from one another by at least one parameter selected from the above-specified list of perspectives.

As used herein, according to some embodiments, expressions such as "two or more of" and "at least two of" in reference to a list including a sub-list (which includes a plurality of items (e.g. elements or claim limitations)) and at least one item not in the sub-list, may refer to only two elements of the sub-list, one element of the sub-list and one listed element which is not in the sub-list, two elements not in the sub-list, and so on. For example, according to some embodiments, wherein the at least one illumination spectrum includes two illumination spectra, the multiplicity of perspectives may consist of, or include, the two illumination spectra.

More generally, according to some embodiments, reflected and/or scattered light may undergo Fourier filtering prior to being detected. The Fourier filtering may be used to increase the number of perspectives and the amount of information obtainable therefrom. According to some embodiments, the multiplicity of perspectives may include slightly out-of-focus illumination.

According to some embodiments, the illumination spectrum may be narrow, for example, when the illuminating light source is a laser. According to some embodiments, the illumination spectrum may be wide, for example, when the illuminating light originates from an incoherent light source such as a lamp. According to some embodiments, the at least one illumination spectrum includes a plurality of illumination spectra. Each illumination spectrum in the plurality of illumination spectra may be narrow—and optionally coherent (e.g. when the illuminating light is coherent laser light)—or wide.

According to some embodiments, multi-perspective scan data may be obtained from the brightfield channel (i.e. brightfield reflected light) and/or the grayfield channel (i.e. grayfield scattered light). As used herein, according to some embodiments, the term "grayfield scattered light" is used in a broad sense to refer to non-brightfield reflected light. In particular, according to some embodiments, the term "grayfield scattered light" may be used to refer also to darkfield scattered light.

According to some embodiments, images corresponding to different perspectives may be obtained simultaneously, or substantially simultaneously. According to some embodiments, images corresponding to different perspectives may be obtained successively. According to some embodiments, some images corresponding to different perspectives may be obtained simultaneously, or substantially simultaneously, while some images corresponding to other perspectives may be obtained at an earlier or later time.

According to some embodiments, the imager used to obtain the scan data in operation 110 may include a plurality of detectors. For example, a first detector may be configured to detect an intensity of a returned light beam while a second detector may be configured to detect a polarization of the returned light beam.

According to some embodiments, wherein all the perspectives are obtained simultaneously, each detector may be allocated (assigned) to a different perspective. Alternatively, according to some embodiments, wherein all the perspectives are obtained successively (sequentially), a single detector may be employed. According to some embodiments, wherein some of the perspectives are obtained simultaneously and some are obtained successively, at least some of the detectors may be allocated to subsets of the multiplicity of perspectives, which respectively include at least two of the perspectives.

According to some embodiments, a segmented pupil may be employed, such as to separate a returned radiation beam, arriving at the pupil, according to the reflection or scattering angle of sub-beams of the returned radiation beam from the wafer. Different detectors may be allocated to detect radiation from different pupil segments, respectively, one detector per pupil segment, so that each pupil segment constitutes a different collection channel corresponding to a different collection angle (and different perspective). (The detectors may be positioned in the conjugate plane to the pupil plane on which the segmented pupil may be positioned.)

According to some embodiments, method 100 includes an operation 120 wherein the scan data obtained in operation 110 undergo an integrated analysis to identify (detect) defects in the scanned region. As used herein, the term "integrated analysis" employed with respect to analysis of multi-perspective scan data (i.e. scan data in at least two different perspectives) refers to an analysis that utilizes scan data from the multiplicity of perspectives, such as to obtain improved defect detection rates. According to some embodiments, the integrated analysis may take into account cross-perspective covariances, that is, covariances between at least some of the different perspectives.

Optionally, according to some embodiments, method 100 may further include an operation 125, wherein it is determined whether identified defects (i.e. identified in operation 125) are of interest (or nuisance). According to some such embodiments, defects, determined to be of interest, may be further classified. Namely, operation 125 may determine the type of deformation giving rise to the defect. Some deformations may be specific to certain types of components (semi-conductor devices) fabricated on the wafer, such as chips or other components, for example, transistors. The classification may be based on measured or derived characteristics of the identified defects in the multiplicity of perspectives.

According to some embodiments, method 100 further includes an operation 130, wherein operations 110 and 120 (and optionally operation 125) may be repeated with respect to additional regions of the wafer (e.g. with respect to other segments of the slice). In particular, the additional regions may constitute one or more predefined greater regions of the wafer, which are to be scanned (e.g. one or more dies). According to some embodiments, operations 110 and 120 (and optionally operation 125) may be repeated until the wafer is fully scanned.

According to some embodiments, wherein method 100 includes both operations 125 and 130, the order of operations 125 and 130 may be reversed.

Figure 2:
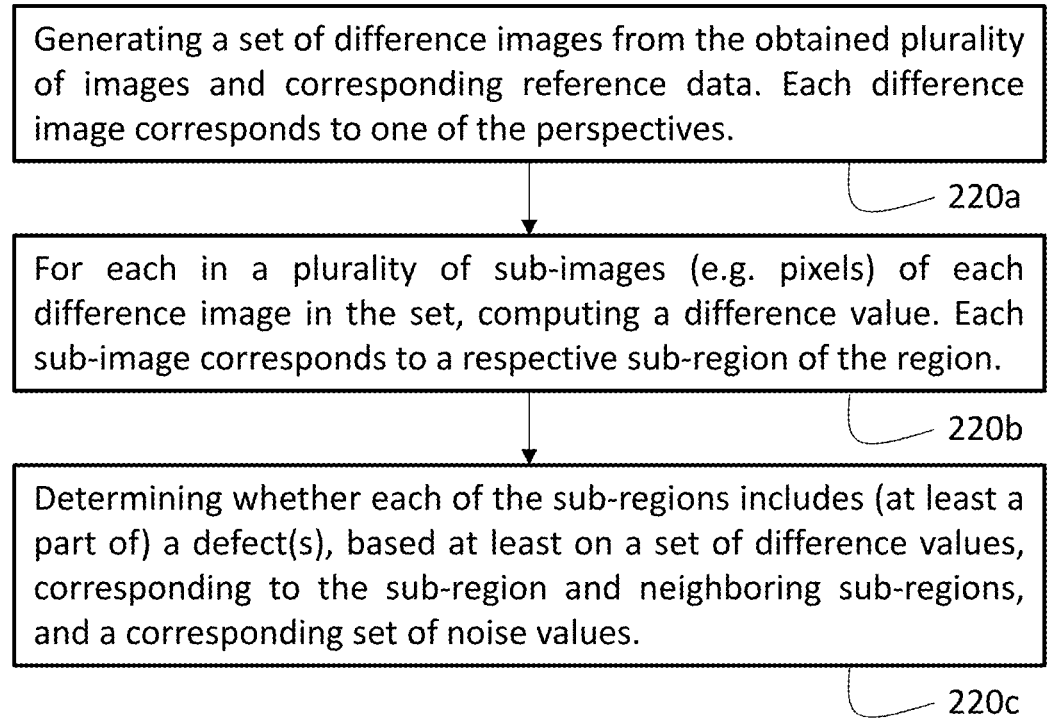
FIG. 2 is a flowchart of an operation for integrated analysis of multi-perspective scan data, according to some specific embodiments of the method of FIG. 1.

FIG. 2 presents a flow chart of an operation 220, which is a specific embodiment of operation 120. According to some embodiments, operation 220 may include:

A sub-operation 220a wherein a set of difference images of the scanned region are generated based on the obtained images (i.e. the plurality of images obtained in operation 110) and corresponding reference data. Each difference image (in the set of difference images) corresponds to one of the perspectives (from multiplicity of perspectives). Each difference image may be generated using one or more of the obtained images corresponding to the perspective and reference data (of the scanned region) corresponding to the perspective.

A sub-operation 220b, wherein for each in a plurality of sub-images (e.g. pixels) of each difference image in the set, a difference value(s) (also referred to as "attribute(s)") is computed. Sub-images corresponding to a same wafer sub-region of a scanned wafer region define a respective set of sub-images such that each sub-image in the set of sub-images may correspond to a different perspective (from the multiplicity of perspectives). (In particular, in sub-operation 220b, for each sub-image in a set of sub-images (corresponding to a same wafer sub-region), a respective difference value may be computed, thereby generating a set of difference values corresponding to the wafer sub-region (and the set of sub-images).)

A sub-operation 220c, wherein each of a plurality of wafer sub-regions, corresponding to the plurality of sub-images of sub-operation 220b, may be determined as being defective (or not), based at least on the set of difference values, corresponding to the wafer sub-region, and a respective (corresponding) set of noise values.

As used herein, according to some embodiments, a sub-region (e.g. corresponding in size to a pixel or a small group of pixels) is said to be "defective" when including a defect or a part of a defect.

As used herein, according to some embodiments, the terms "difference value(s)"—in reference to a sub-image—and "pixel value(s)"—in reference to the same sub-image—may be used interchangeably when the sub-image is a pixel.

According to some embodiments, the reference data may include reference images that have been obtained, for example, in scanning of the wafer or a wafer fabricated to have the same design, or generated based on design data of the wafer such as CAD data.

As used herein, the term "difference image" is to be understood in an expansive manner and may refer to any image obtained by combining at least two images, for example, a first image (e.g. an image of a scanned region of a wafer or an image obtained from a plurality of images of the scanned region) and a second image (e.g. a reference image derived from reference data pertaining to the scanned region). The combination of the two images may involve any manipulation of the two images resulting in at least one "difference image", which may reveal variation (differences) between the two images, or, more generally, may distinguish (differentiate) between the two images (when differences are present). In particular, it is to be understood that the term "combination", with reference to two images, may be used in a broader sense than subtraction of one image from the other and covers other mathematical operations, which may be implemented additionally or alternatively to subtraction. Further, it is to be understood that prior to combining the two images to obtain the difference image, one or both of the two images may be individually manipulated (that is, pre-processed). For example, the first image may be registered with respect to the second image.

As used herein, the term "reference data" should be expansively construed to cover any data indicative of the physical design of a (patterned) wafer and/or data derived from the physical design (e.g. through simulation). According to some embodiments, "reference data" may include, or consist of, "design data" of the wafer, such as, for example, the various formats of CAD data.

Additionally, or alternatively, "reference data" may include, or consist of, data obtained by fully or partially scanning the wafer, e.g. during recipe setup or even in runtime. For example, scanning of one die, or multiple dies having the same architecture, during runtime may serve as reference data for another die of the same architecture. Further, a first wafer fabricated to a certain design, may be scanned during recipe setup and the obtained scan(s) data may be processed to generate reference data or additional reference data for subsequently fabricated wafers of the same design (as the first wafer). Such "self-generated" reference data is imperative when design data is not available but may also be beneficial even when design data is available.

More generally, it is to be understood that the term "difference image" may refer to any set of derived values obtained by jointly manipulating two sets of values: a first set of values (obtained during a scan) and a second set of values (reference values obtained from reference data), such that each derived value in the set corresponds to a sub-region (e.g. a pixel) of a scanned region on the wafer. The joint manipulation may involve any mathematical operations on the two sets of values such that the (resulting) set of derived values may reveal differences, if present, between the two sets of values, or, more generally, may distinguish between the two sets of values. (The mathematical operations may or may not include subtraction.) In particular, the joint manipulation is not limited to manipulation of corresponding pairs of values. That is, each (difference) value in the set of difference values may result from joint manipulation of a plurality of values in the first set and a plurality of values in the second set.

According to some embodiments, the set of difference values pertaining to a sub-image may also include scan data pertaining to neighboring sub-images or data generated based on scan data pertaining to neighboring sub-images. For example, according to some embodiments wherein each sub-image is a pixel, the set of pixel values (e.g. intensity values) corresponding to a pixel may also include pixel values of neighboring pixels. As used herein, according to some embodiments, two sub-images (of a given image, e.g. a difference image) may be said to be "neighbors" when the sub-images are "nearest neighbors". That is, the sub-images are adjacent to one another in the sense of no other sub-image being present there between. According to some embodiments, two pixels may be said to be "neighbors" not only when the pixels are nearest neighbors, but also when separated from one another by one pixel at most, two pixels at most, three pixels at most, five pixels at most, or even ten pixels at most. Each possibility corresponds to different embodiments.

According to some embodiments, the set of difference values pertaining (corresponding) to a first sub-image includes also scan data pertaining to neighboring sub-images, such that the first sub-image is positioned centrally relative to the neighboring sub-images.

According to some embodiments, wherein the sub-images are pixels, the set of difference values pertaining to a first pixel includes also scan data pertaining to neighboring pixels, such that the first pixel and the neighboring pixels constitute a block of m×n pixels with $3 \leq m \leq 11$ and $3 \leq n \leq 11$. Larger values of n and m are also possible and may be required, for example, when the size of the defects or the correlation length of the noise are large. According to some such embodiments, the first pixel may be positioned at the center of the block. In particular, when the size of a suspected defect is greater than the first pixel (i.e. when the first pixel may include (in the sense of depicting) only a part of the suspected defect), n and m may be selected such that the block (formed by the first pixel and the neighboring first pixels) depicts in full the suspected defect.

According to some embodiments, sub-operation 220c may include computing the set of noise values. According to some embodiments, the set of noise values may be computed based on the set of difference values corresponding to the sub-region.

According to some embodiments, method 100 may include a preliminary scanning operation wherein the wafer is partially scanned. More specifically, the wafer may be "sampled" in the sense that a sample of regions thereof is scanned. Each region in the sample (i.e. each region from the sampled regions) is representative of regions of the wafer which are characterized by a certain architecture, type(s) of components, and so on.

According to some embodiments, to reduce the computational load and expedite the wafer analysis, certain computational operations may be implemented only with respect to preliminary scan data. For example, from a group of dies fabricated to have the same design, one or more dies may be sampled (in the preliminary scanning operation). Scan data obtained from corresponding regions within the sampled dies may be used later (e.g. in sub-operation 220c) with respect to corresponding regions of dies which have not been sampled. In particular, according to some such embodiments, sets of noise values corresponding to the sampled regions may be computed and stored in a memory (i.e. prior to operation 110). The sets of noise values may later be used in sub-operation 220c as part of the determination of whether a scanned region includes a defect.

According to some embodiments, operation 120 may additionally include a sub-operation wherein images (of the same region) pertaining to different perspectives, and which have been obtained at different times (in particular, times differing by more than a timescale typical of high-frequency physical effects impacting the wafer analysis system (used to inspect the wafer) and/or the wafer.), are registered with respect to one another. This "perspective-to-perspective" registration may be implemented, for example, prior to sub-operation 220a (i.e. in embodiments wherein operation 120 is carried out in accordance with FIG. 2). The perspective-to-perspective registration may be implemented in addition to standard die-to-die registration and/or cell-to-cell registration. According to some embodiments, e.g. wherein different images pertaining to different perspectives are known to be shifted from one another by a subpixel, a pixel, or even as many as ten pixels, alignment protocols may be employed. This may advantageously obviate the need for applying registration protocols, which are comparatively more cumbersome.

According to some embodiments, prior to sub-operation 220a, images in different perspectives of a same scanned region may be registered with respect to one another. The registration may be implemented using scan data obtained from a common channel (which does not change when switching between perspectives). According to some such embodiments, the multi-perspective scan data is obtained from the brightfield channel, while the grayfield channel is used for registering the images with respect to one another. Alternatively, according to some embodiments, the multi-perspective scan data is obtained from the grayfield channel, while the brightfield channel is used for registering the images with respect to one another. (The "perspective-to-perspective" registration may be implemented in addition to standard die-to-die registration and/or cell-to-cell registration.) According to some embodiments, the perspectives are always acquired at least two at a time, with one perspective being common to all the acquired perspectives.

FIG. 3 presents a flowchart of a sub-operation 320c, which is a specific embodiment of sub-operation 220c. According to some embodiments, sub-operation 320c may include computation of a covariance matrix (which constitutes the set of noise values). According to some embodiments, the computation of the covariance matrix may be based on a corresponding set of difference values computed in sub-operation 220b and/or on scan data obtained in the preliminary scanning of the wafer. The terms in the off-diagonal blocks in the covariance matrix include cross-perspective covariances (both between sub-images corresponding to different (neighboring) sub-regions as well as sub-images corresponding to a same sub-region). According to some such embodiments, the determining of whether a sub-region includes a defect (or a part of a defect), in sub-operation 220c, may include:

- A sub-operation 320c1 of multiplying a first vector v—whose components include the difference values in the set of difference values corresponding to the sub-region—by the inverse of the corresponding covariance matrix C to obtain a second vector u. (It is noted that the set of difference values, corresponding to the sub-region, also includes difference values pertaining to neighboring sub-regions.)
- A sub-operation 320c2 of taking the scalar product of the second vector u and a third vector k (e.g. a predetermined kernel corresponding to the sub-region). The components of the third vector k may characterize the signature of a specific type of defect(s)—which the sub-region is suspected of at least partially including—as would appear in a difference image (ideally) obtained in essentially the absence of wafer noise.
- A sub-operation 320c3 wherein it is checked whether the scalar product exceeds a pre-determined threshold B, and, if so, labeling the sub-region as including a defect (or a part of a defect).

FIGS. 4A-4G present algebraic expressions used in the computations involved in the sub-operation of FIG. 3, according to some embodiments. The first vector v is shown in FIG. 4A for the case that the number of sub-images is n and the number of perspectives is m. v therefore includes n×m components. (It is noted that each of the vectors v, u, and k is defined as a column vector.) Each component of v may be labeled by a pair of indices i and j, wherein the index i=1, 2, ..., n denotes the sub-image (e.g. the pixel) and the index j=1, 2, ..., m denotes the perspective. Thus, as defined in FIG. 4A, the first n components of v, i.e. $v_{11}, v_{12}, \ldots v_{1n}$ represent difference values (of the n sub-images) in the first perspective. Similarly, components n+1 to 2n of v, i.e. $v_{21}, v_{22}, \ldots v_{2n}$, represent difference values in the second perspective, and so on. The vector v is thus "composed" of m n-component vectors $v_1$ shown in FIG. 4B. Each of the $v_1$ corresponds to a different perspective (labeled by the index j).

Figure 5A:
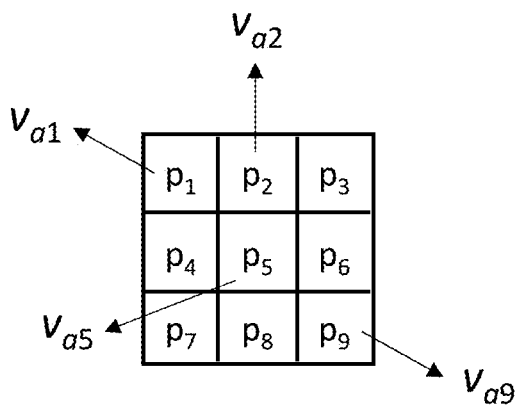
FIGS. 5A and 5B present two different ways of enumerating sub-images, according to some embodiments.
Figure 5B:
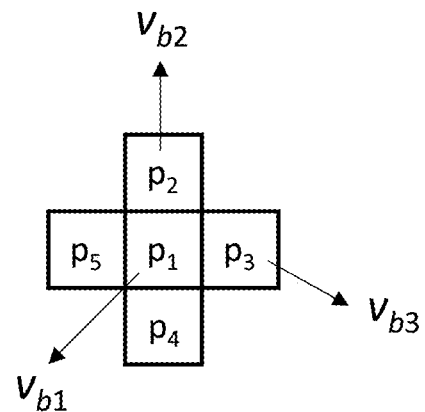

Referring also to FIGS. 5A and 5B, FIG. 5A shows a possible way of enumerating pixels (and more generally sub-images) and therefore the order of the terms in v (as well as C and k) in the case that the number of pixels $p_i$ (i=1, 2, ..., 9) considered is nine. In addition to the central pixel $p_5$ (which is the pixel to be analyzed), the eight closest pixels thereto are shown. The set of pixel values (of the central pixel) includes not only values pertaining to the central pixel, but also to the eight surrounding pixels.

FIG. 5B shows a possible way of enumerating pixels (and more generally sub-images) and therefore the order of the terms in v (as well as C and k) in the case that the number of pixels $p_j$ (j=1, 2, ..., 5) considered is five. In addition to the central pixel pi, the four closest pixels thereto are shown. The set of pixel values (of the central pixel) includes not only values pertaining to the central pixel, but also to the four closest neighboring pixels.

The covariance matrix C is shown in FIG. 4C. For the above choice of arrangement of the components within the first vector v (i.e. as defined in FIGS. 4A and 4B), C assumes a structure wherein C is "composed" of m×m smaller matrices $C_{ab}$ (a=1, 2, ..., m; b=1, 2, ..., m) such that each of the $C_{ab}$ is an n×n matrix covariance matrix. Each of the m $C_{aa}$ (a=1, 2, ..., m) corresponds to the a-th perspective, respectively, and "correlates" between different sub-images corresponding to the same (i.e. the a-th) perspective. Each of the "off-diagonal" matrices $C_{a,\,b\neq a}$ (i.e. when b≠a) "correlates" between sub-images in different perspectives, i.e. in the a-th and b-th perspectives, respectively. The $C_{ab}$ are shown in FIG. 4D.

The third vector k is shown in FIG. 4E for the same case (i.e. wherein the number of sub-images is n and the number of perspectives is m). Similarly, to the first vector v, the third vector k is "composed" of m n-component vectors 1 shown in FIG. 4F. Each of the 1 corresponds to a different perspective (labeled by the index j).

The second vector u (obtained in sub-operation 320c1) is the matrix product of the (one-dimensional matrix) v by the inverse of C). In sub-operation 320c3 it is checked whether k·u>B. It is noted that the value of the threshold B may depend on the predetermined kernel (i.e. on characteristics of a defect(s) the sub-region is suspected of including or partially including). The value of the threshold B may also vary from one sub-region to a neighboring sub-region depending on the geometries of the respective patterns thereon. This may be the case even when the sub-regions and the neighboring sub-regions each correspond in size to a pixel and each include a respective part of the same defect. A defect may typically measure at a least about 10 nm×10 nm in area, and may affect the signals obtained from a region measuring at least about 100 nm×100 nm therearound (i.e. corresponding to at least about 3×3 pixels given that a pixel corresponds to an area of about 10 nm×10 nm on the wafer) when the radiation source is optical and produces an illumination spot having a diameter of about 100 nm. The threshold B may be chosen, such that the percentage of false alarms (i.e. cases wherein a sub-region of a wafer, which is not defective, is mistakenly determined as defective) would not exceed a pre-defined (threshold) rate.

According to some embodiments, to speed up the computations, some of the off-diagonal terms or blocks (e.g. some of the matrices $C_{a,\,b\neq a}$) of the covariance matrix are not computed. (If none of the off-diagonal blocks are computed, then the computations involved amount to computing m smaller covariance matrices (as shown, for example, in FIG. 4G for the case m=3). Each of the m smaller covariance matrices corresponds to one of the perspectives with m being the number of perspectives.)

As mentioned above, the third vector k (i.e. the predetermined kernel) characterizes the signature of a defect. or a family of defects (i.e. similar defects), in the absence (or substantially in the absence) of wafer noise, and may be obtained by applying a matched filter to the signature of the defect, or the family of defects, in the presence of wafer noise, such as to maximize the signal-to-noise ratio. According to some embodiments, the third vector k characterizes the signature of a specific type of defect the sub-region is suspected of including (or partially including).

According to some embodiments, the predetermined kernel may be derived based on one or more of: (i) experimental measurements implemented on wafer regions known to include one or more defects, (ii) computer simulations of light scattering from defects, (iii) physical models describing defect behavior, and (iv) machine learning algorithms designed to provide optimized kernels.

According to some embodiments, some pairs of perspectives may be known to exhibit weaker correlations than other pairs of perspectives (e.g. based on scan data obtained in preliminary scanning). According to some such embodiments, in sub-operation 320c, terms in blocks corresponding to pairs of perspectives, which are known to exhibit weaker correlations, are not computed in order to expedite the analysis.

According to some embodiments, higher moments of the joint probability distribution (relating the measured values obtained by the imager in operation 110)—beyond covariances—may be taken into account as part of the determination in sub-operation 220c of whether a sub-region includes (or partially includes) a defect. For example, according to some embodiments, skewness and/or kurtosis may be taken into account.

While some of the above embodiments are directed to implementations of method 100 using optical scanning, as already mentioned, according to some embodiments, method 100 may be implemented using a scanning electron microscope (SEM). According to some such embodiments, the multiplicity of perspectives includes two or more of at least one intensity of an irradiating electron beam(s) (e-beam(s)), at least one intensity of a returned e-beam(s), at least one spin of an irradiating e-beam(s), at least one spin of a returned e-beam(s), one or more incidence angle(s) of the irradiated e-beam(s), and one or more collection angle(s) of the returned e-beam(s).

According to some alternative embodiments, method 100 may be implemented using an atomic force microscope (AFM). According to some such embodiments, the multiplicity of perspectives may include different types of AFM tips, different tapping modes, and/or applying the AFM at different resonance frequencies.

According to some embodiments, wherein the image resolution (i.e. the size of the pixels) provided by the imager may be higher than required (for example, when method 100 is implemented using a SEM or an AFM), or in order to speed up the wafer analysis, difference values corresponding to pixels within a sub-image of a difference image may be averaged over to obtain a single ("coarse-grained") difference value corresponding to the sub-image. In such embodiments, the set of difference values corresponding to a sub-region may include averaged difference values pertaining to sub-images of the sub-region, and averaged difference values pertaining to sub-images of neighboring sub-regions, in each of the multiplicity of perspectives. (Each averaged difference value was obtained by averaging over difference values pertaining to pixels making up the respective sub-image). The covariance matrix may then be computed based on the averaged difference values, thereby potentially allowing to significantly lighten the computational load.

Systems

Figure 6:
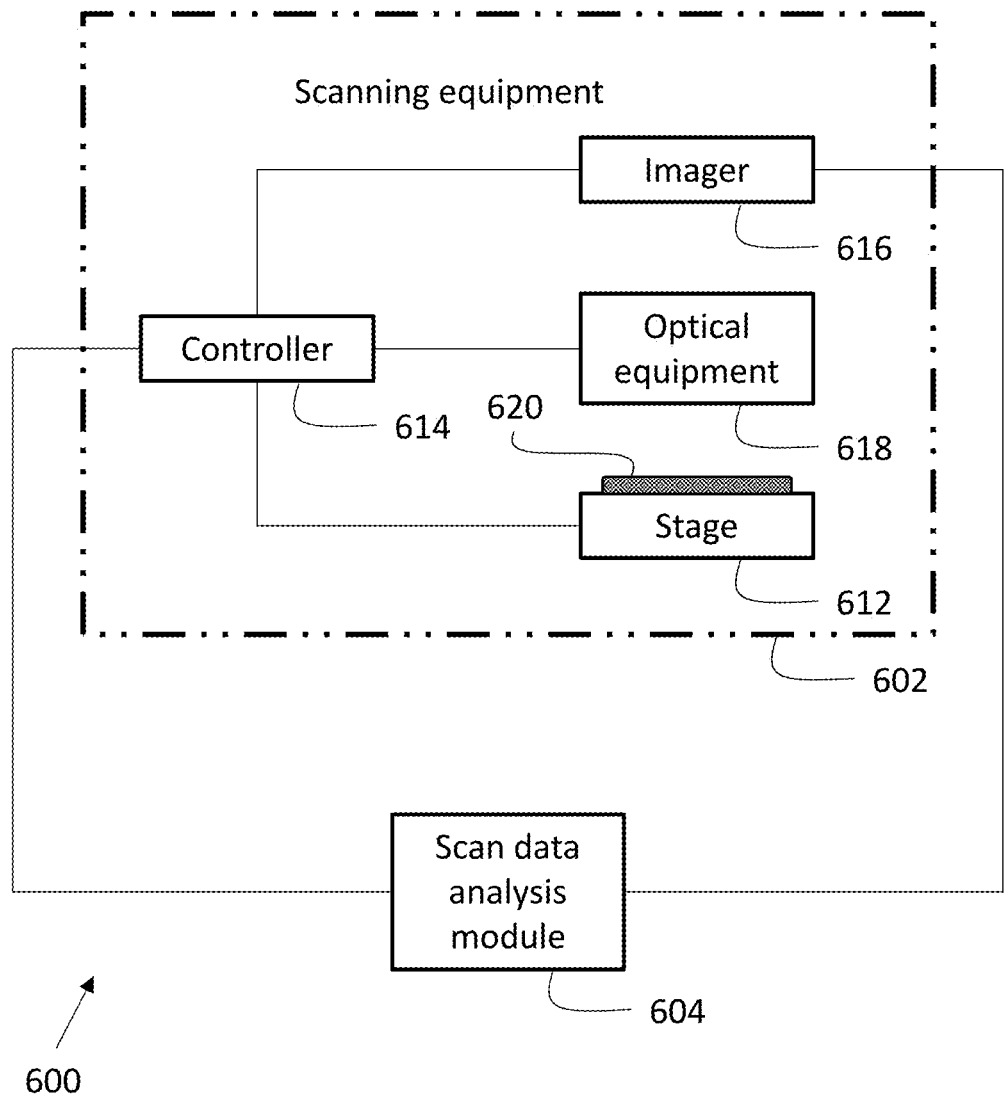
FIG. 6 presents a block diagram of a computerized system for obtaining and analyzing multi-perspective scan data of a wafer (also depicted), according to some embodiments.

According to an aspect of some embodiments, there is provided a computerized system for obtaining and analyzing multi-perspective scan data of a wafer. FIG. 6 is a block diagram of such a computerized system, a computerized system 600, according to some embodiments. System 600 includes scanning equipment 602 and a scan data analysis module 604.

Scanning equipment 602 is configured to scan a wafer in each of a multiplicity of perspectives (e.g. as listed above in the Methods subsection). According to some embodiments, scan data pertaining to two or more of the multiplicity of perspectives may be obtained simultaneously or substantially simultaneously. Additionally or alternatively, according to some embodiments, scanning equipment 602 may be configured to scan a wafer, one perspective (from the multiplicity of perspectives) at a time. That is, scanning equipment 602 may be configured to switch between perspectives.

Scan data analysis module 604 is configured to (i) receive multi-perspective scan data obtained by scanning equipment 602, and (ii) perform an integrated analysis of the multi-perspective scan data, as further elaborated on below.

According to some embodiments, scanning equipment 602 includes a stage 612, a controller 614, an imager 616 (imaging device), and optical equipment 618. Scanning equipment 602 is delineated by a dashed-double-dotted box to indicate that components therein (e.g. stage 612 and imager 616) may be separate from one another, e.g. in the sense of not being included in a common housing.

Stage 612 is configured to have placed thereon a sample to be inspected, such as a wafer 620 (or an optical mask). Wafer 620 may be patterned, but the skilled person will appreciate that method 100 may be utilized to detect defects also in bare wafers. According to some embodiments, stage 612 may be moveable, as elaborated on below. Imager 616 may include one or more light emitters (e.g. a visible and/or ultraviolet light source) configured to irradiate wafer 620. Further, imager 616 may include one or more light detectors. In particular, imager 616 may apply collection techniques including brightfield collection, grayfield collection, and the like. Optical equipment 618 may include optical filters (e.g. spatial filters, polarizing filters, Fourier filters), beam splitters (e.g. polarizing beam splitters), mirrors, lenses, prisms, grids, deflectors, reflectors, apertures, and the like, configured to allow obtaining scan data pertaining to multiple perspectives. According to some embodiments, optical equipment 618 may be configured to allow switching scanning equipment 602 between different perspectives. For example, optical equipment 618 may include polarizing filters and/or beam splitters configured to set the polarization of emitted (illuminating) light and/or select the polarization of the collected (returned) light.

More specifically, according to some embodiments, optical equipment 618 may include any arrangement of optical components configured to determine (set) one or more optical properties (such as shape, spread, polarization) of the radiation beam from a radiation source of imager 616, and the trajectory of the incident radiation beam. According to some embodiments, optical equipment 618 may further include any arrangement of optical components configured to select (e.g. by filtering) one or more optical properties of one or more returned radiation beams (e.g. beams specularly reflected by, or diffusely scattered off of, wafer 620) prior to the detection thereof, and the trajectories followed by the one or more returned beams when returned from wafer 620. According to some embodiments, optical equipment 618 may further include optical components configured to direct the one or more returned radiation beams towards the detectors of imager 616.

Controller 614 may be functionally associated with stage 612, imager 616, and optical equipment 618, as well as with scan data analysis module 604. More specifically, controller 614 is configured to control and synchronize operations and functions of the above-listed modules and components during a scan of a wafer. For example, stage 612 is configured to support an inspected sample, such as wafer 620, and to mechanically translate the inspected sample along a trajectory set by controller 614, which also controls imager 616.

Scan data analysis module 604 includes computer hardware (one or more processors, such as image and/or graphics processor units, and volatile as well as non-volatile memory components; not shown). The computer hardware is configured to analyze multi-perspective scan data received from imager 616, of a region on wafer 620, for presence of defects, essentially as described above in the Methods subsection.

Scan data analysis module 604 may further include an analog-to-digital (signal) converter (ADC) and a frame grabber (not shown). The ADC may be configured to receive analog image signals from imager 616. Each analog image signal may correspond to a different perspective from a multiplicity of perspectives. The ADC may further be configured to convert the analog image signals into digital image signals and to transmit the digital image signals to the frame grabber. The frame grabber may be configured to obtain from the digital image signals, digital images (block images or image frames) of scanned regions on a scanned wafer (e.g. wafer 620). Each digital image may be in one of the multiplicity of perspectives. The frame grabber may be further configured to transmit the digital images to one or more of the processors and/or memory components.

More specifically, scan data analysis module 604 may be configured to:

Generate sets of difference values, in each of the multiplicity of perspectives, based on scan data of a scanned region received from imager 616 and corresponding reference data, which may be stored in the memory component(s). Each set of difference values corresponds to a sub-region (e.g. "pixel") of the scanned region, essentially as described above in the Methods subsection in the description of FIG. 2.

For each sub-region, determine whether the sub-region is defective based at least on the corresponding set of difference values and a respective set of noise values, essentially as described above in the Methods subsection in the description of FIG. 2, and—according to some embodiments of system 600—in the description of FIG. 3.

According to some embodiments, scan data analysis module 604 may be configured to, for each set of difference values, and, based at least thereon, generate the corresponding set of noise values, essentially as described above in the Methods subsection in the description of FIG. 2, and—according to some embodiments of system 600—in the description of FIG. 3. According to some embodiments, the generation of the set of noise values may be based at least on scan data obtained in a preliminary scan(s) of the wafer, wherein representative regions of the wafer are scanned.

According to some embodiments, the determination of whether the sub-region is defective, may be implemented taking into account the type of defect(s) the sub-region is suspected of including or partially including. In particular, the determination may involve computation of a covariance matrix, and may further include computations involving a predetermined kernel—which characterizes the signature of the suspected type of defect(s) in essentially the absence of wafer noise—and a corresponding threshold.

According to some alternative embodiments, not depicted in the figures, there is provided a computerized system for obtaining and analyzing multi-perspective scan data of a wafer. The system may be similar to system 600 but differs therefrom at least in utilizing an electron beam(s), rather than electromagnetic radiation, to irradiate the wafer. In such embodiments, an imager of the system may include a scanning electron microscope.

According to some alternative embodiments, not depicted in the figures, there is provided a computerized system for obtaining and analyzing multi-perspective scan data of a wafer. The system may be similar to system 600 but differs therefrom at least in utilizing an atomic force microscope rather than an optical-based imager.

Figure 7A:
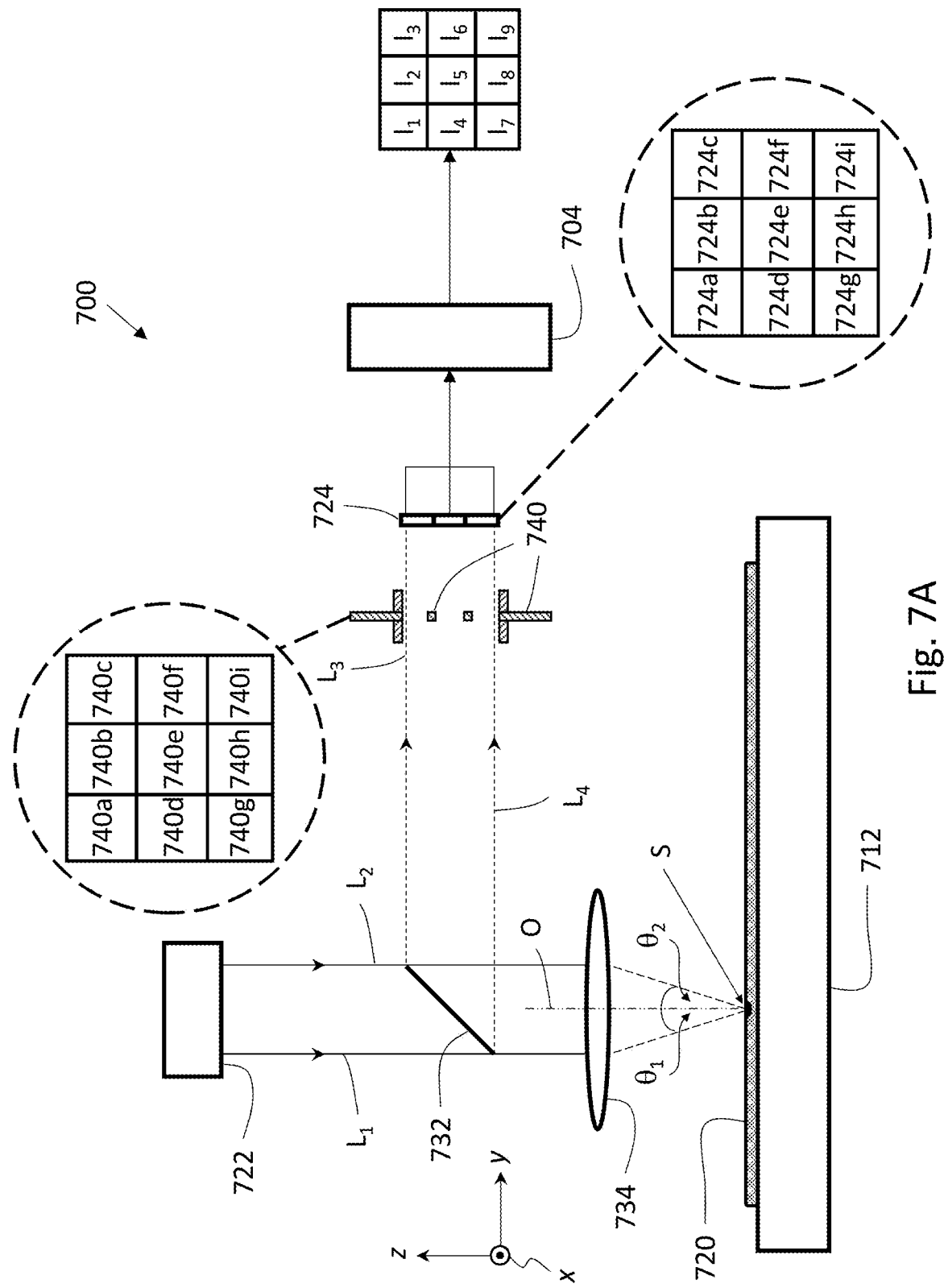
FIG. 7A schematically depicts a computerized system for obtaining and analyzing multi-perspective scan data of a wafer (also depicted), the depicted computerized system is a specific embodiment of the computerized system of FIG. 6.

FIG. 7A schematically depicts a computerized system 700, which is a specific embodiment of system 600. System 700 includes a radiation source 722, a plurality of detectors 724, which together constitute (or form part of) an imager, which is a specific embodiment of imager 616 of system 600. System 700 further includes a scan data analysis module 704, which is a specific embodiment of scan data analysis module 604 of system 600. System 700 further includes a beam splitter 732, and an objective lens 734, which together constitute (or form part of) optical equipment, which is a specific embodiment of optical equipment 618 of system 600. Also shown are a stage 712 (which is a specific embodiment of stage 612 of system 600) and a wafer 720 placed thereon.

An optical axis O of objective lens 734 is also indicated. Optical axis O extends in parallel to the z-axis.

In operation, light is emitted by radiation source 722. The light is directed towards beam splitter 732 wherethrough some of the light is transmitted. The transmitted light is focused by objective lens 734 on wafer 720, such as to form an illumination spot S thereon. Returned light (which underwent specular reflection off of wafer 720) is directed back towards objective lens 734, and is refracted therethrough towards beam splitter 732. A portion of the returned light (having been refracted via objective lens 734) is reflected by beam splitter 732 towards detectors 724.

To facilitate the description, the trajectories of a pair of light rays are indicated. More specifically, a first light ray $L_1$ and a second light ray $L_2$ indicate light rays emitted by radiation source 722. A third light ray $L_3$ and a fourth light ray $L_4$ indicate (returned) light rays travelling towards detector 724 after having been reflected off of beam splitter 732 (following scattering off of wafer 712 and refraction through objective lens 734). Third light ray $L_3$ constitutes the portion of first light ray $L_1$, which remains after the transmission through, and subsequent reflection by, beam splitter 732. Fourth light ray $L_4$ constitutes the portion of second light ray $L_2$, which remains after the transmission through, and subsequent reflection by, beam splitter 732.

Also indicated is a segmented pupil 740 (a segmented aperture, which also forms part of the optical equipment). Segmented pupil 740 may be positioned on the pupil plane and detectors 724 may be positioned on a plane conjugate to the pupil plane. Segmented pupil 740 is partitioned into a plurality of pupil segments (or sub-apertures). The segmentation of the pupil allows to separate a returned beam (e.g. a light beam reflected off of the wafer), arriving at the pupil, into sub-beams, according to the respective return angle of each of the sub-beams, so that each pupil segment will correspond to a different perspective. That is, each of the perspectives generated by segmented pupil 740 corresponds to a different collection angle.

As a non-limiting example, in FIG. 7A, segmented pupil 740 is shown partitioned into nine pupil segments 740a to 740i, which are arranged in a square array, and detectors 724 include nine corresponding detectors 724a to 724i. System 700 is configured such that light (originating in radiation source 722, and which has undergone specular reflection off of wafer 720) arriving at each of the pupil segments, continues therefrom towards a respective detector from detectors 724. That is, light passing through first pupil segment 740a is sensed by first detector 724a, light passing through second pupil segment 740b is sensed by second detector 724b, and so on). Each of detectors 724 is thus configured to sense light returned at a different angle, respectively.

According to some embodiments, the optical equipment may further include optical guiding mechanisms (not shown) for directing light passing through each of the pupil segments. The optical guiding mechanisms may be configured to ensure that light passing through a pupil segment is directed to a respective (target) detector (from detectors 724) without "leakage" to the other detectors.

According to some embodiments, and as depicted in FIG. 7A, the optical equipment may be configured such that light arriving at objective lens 734 (directly) from radiation source 722, arrives thereat as a collimated light beam. Wafer 720 may be positioned at, or substantially at, the focal plane of objective lens 734, so that the light rays, incident on wafer 720, form illumination spot S thereon, which may be as small as about 100 nanometers.

Different light rays from the collimated light beam, having been refracted through objective lens 734, may be incident on wafer 720 at different angles. A refracted portion of first light ray $L_1$ is incident on wafer 720 at a first angle of incidence $\theta_1$ (i.e. the angle formed by the refracted portion with optical axis O) and a refracted portion of second light ray $L_2$ is incident on wafer 720 at a second incidence angle $\theta_2$. To facilitate the description, it is assumed that $\theta_2$ is equal to $\theta_1$, so that the trajectory followed by the refracted portion of second light ray $L_2$ from objective lens 734 to wafer 720 is followed in reverse by the refracted portion of first light ray $L_1$ after being reflected off of wafer 720. Likewise, the trajectory followed by the refracted portion of first light ray $L_1$ from objective lens 734 to wafer 720 is followed in reverse by the refracted portion of second light ray $L_2$ after being reflected off of wafer 720.

Thus, when no ambiguity arises from the context, $\theta_2$ may be used to refer to the reflection (return) angle of the refracted portion of first light ray $L_1$ off of wafer 720 instead of to the incidence angle of the refracted portion of second light ray $L_2$ on wafer 720. Similarly, when no ambiguity arises from the context, $\theta_1$ may be used to refer to the reflection (return) angle of the refracted portion of second light ray $L_2$ off of wafer 720 instead of to the incidence angle of the refracted portion of first light ray $L_1$ on wafer 720.

Figure 7B:
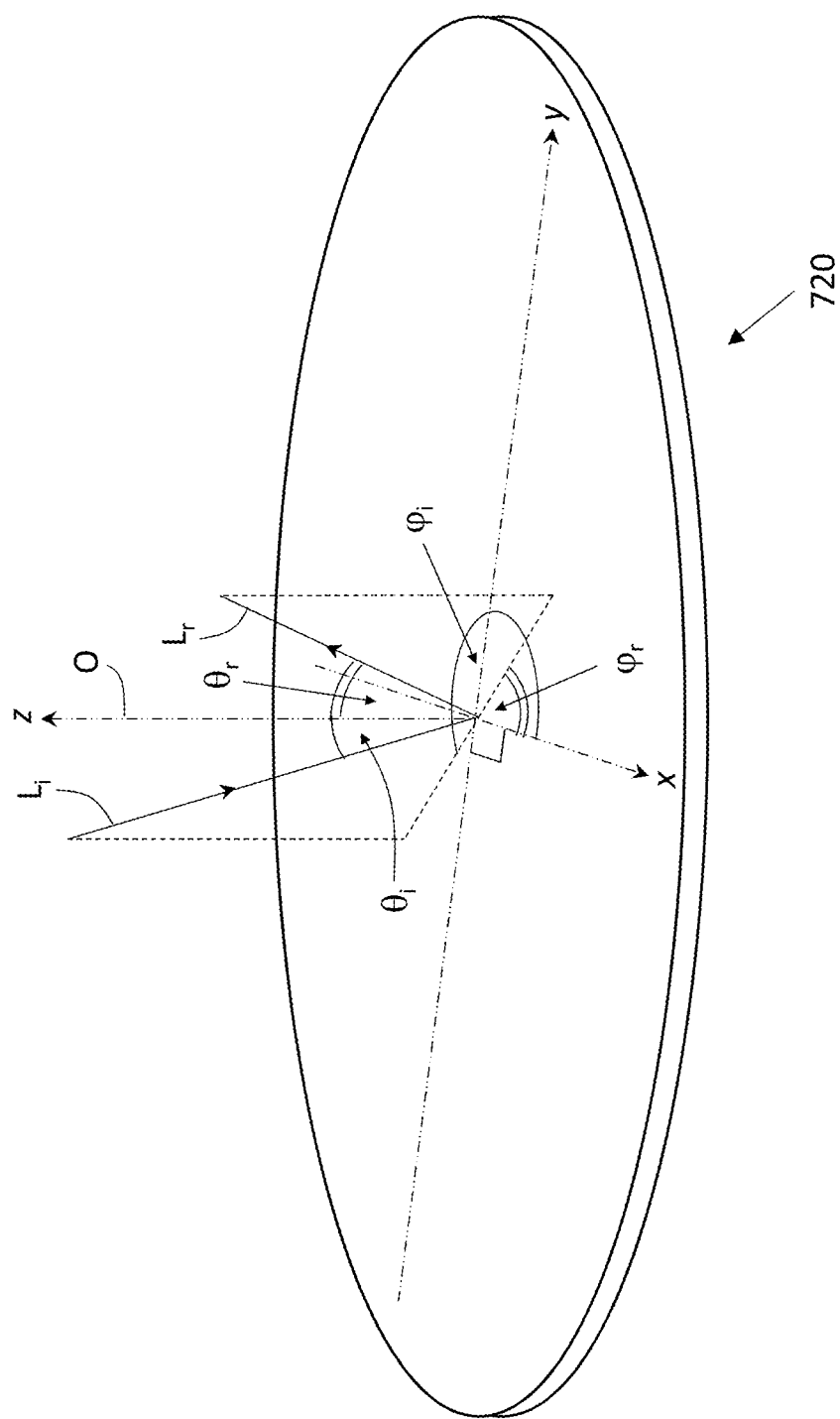
FIG. 7B schematically depicts specular reflection of a light ray off of the wafer of FIG. 7A, according to some embodiments.

It is noted that not only the angle of incidence may be relevant for multi-perspective wafer analysis, but also the azimuthal angle, in particular, when wafer 720 is patterned (due to one or more asymmetries introduced by the pattern relative to the wafer surface). That is, the angle formed by the "projection" of the incident light ray onto the wafer surface with an x-axis of an orthogonal coordinate system parameterizing the (lateral dimensions of the) wafer surface. In FIG. 7B both an angle of incidence (or polar angle) $\theta_i$ and a first azimuthal angle $\varphi_i$ of a light ray $L_1$, incident on wafer 720, are indicated. Also indicated are an angle of reflection (or polar angle) $\theta_r = \theta_i$ and a second azimuthal angle $\varphi_r = \varphi_i - \pi$ of a light ray $L_r$, reflected off wafer 720.

Each of detectors 724 is positioned such as to detect light rays, which have impinged on wafer 720 at a polar angle $\theta$ (or, more precisely, a continuous range of polar angles centered about $\theta$) and an azimuthal angle $\varphi$ (or, more precisely, a continuous range of azimuthal angles centered about $\varphi$).

According to some embodiments, system 700 may further include infrastructure (e.g. suitably positioned detectors) for sensing light, which has been diffusely scattered off of wafer 720 (in particular, light rays outside of the cone of light generated by objective lens 734). According to some embodiments, system 700 may be configured to use images, generated based on the sensed grayfield scattered light, as an additional perspective(s) and/or as reference images for perspective-to-perspective registration.

Scan data analysis module 704 is configured to receive scan data from detectors 724 and based thereon, determine whether a scanned region includes one or more defects, essentially as described with respect to scan data analysis module 604 of system 600. Scan data from each of detectors 724a to 724i may be used to generate difference images $I_1$ to $I_9$, respectively, each in a different perspective.

Since in FIG. 7A, segmented pupil 740 is depicted as including nine pupil segments, to each of which corresponds a detector from detectors 724, the number of perspectives is nine. The set of difference values associated with a first "pixel" (i.e. sub-region of a size corresponding to an image pixel) on the wafer therefore includes $9 \times (N+1)$ elements (difference values), where N is the number of neighboring pixels taken into account. That is to say, N is the number of neighboring pixels whose difference values are included in the set of difference values associated with the first pixel. When the number of neighboring pixels, for example, is eight (essentially as depicted in FIG. 5A), the set of difference values includes 81 elements. (The predetermined kernel also includes 81 elements). The covariance matrix is then an 81×81 matrix.

While in FIG. 7A, the pupil segments are depicted as being of equal shape and size, it is to be understood that in general different pupil segments of segmented pupil 740 may differ from one another in shape and/or in size. In particular, according to some embodiments, different pupil segments may differ in area (i.e. their lateral dimensions parallel to the zx-plane) as well as in their respective longitudinal extensions (for example, the y-coordinate of the entrance and/or exit of a pupil segment may vary from one pupil segment to another).

Figure 8:
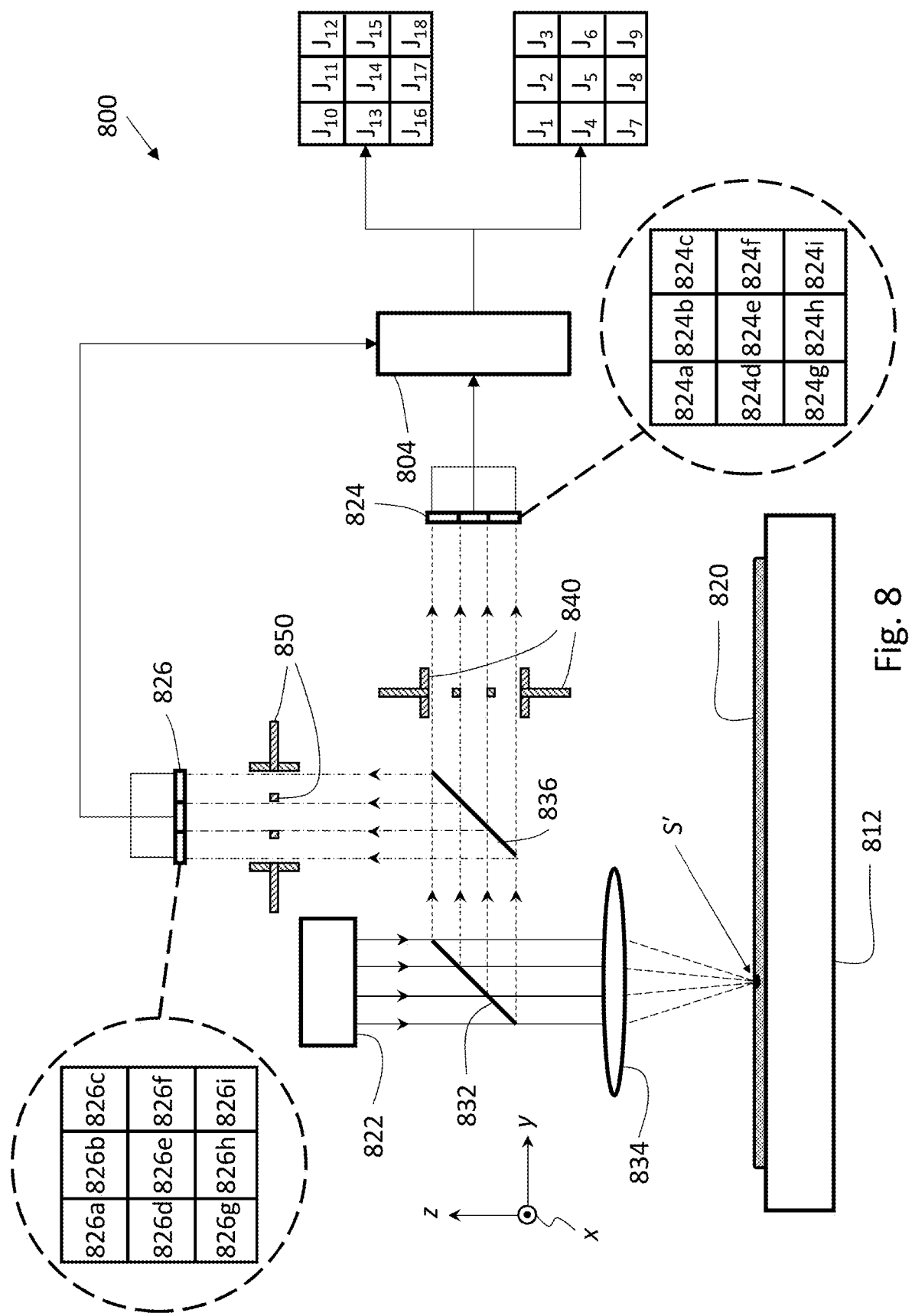
FIG. 8 schematically depicts a computerized system for obtaining and analyzing multi-perspective scan data of a wafer (also depicted), the depicted computerized system is a specific embodiment of the computerized system of FIG. 6.

FIG. 8 schematically depicts a computerized system 800, which is a specific embodiment of system 600. System 800 is similar to system 700 but differs therefrom in including optical components separating the light returned from the wafer into different polarizations, thereby allowing to double the number of perspectives. More specifically, system 800 includes a radiation source 822, a first plurality of detectors 824, and a second plurality of detectors 826, which together constitute (or form part of) an imager, which is a specific embodiment of imager 616 of system 600. System 800 further includes a scan data analysis module 804, which is a specific embodiment of scan data analysis module 604 of system 600. System 800 further includes a first beam splitter 832, an objective lens 834, a second beam splitter 836, a first segmented pupil 840, and a second segmented pupil 850, which together constitute (or form part of) optical equipment, which is a specific embodiment of optical equipment 618 of system 600. Second beam splitter 836 is a polarizing beam splitter. Also shown are a stage 812 (which is a specific embodiment of stage 612 of system 600) and a wafer 820 placed thereon.

According to some embodiments, radiation source 822 may be similar to radiation source 722, and each of plurality of detectors 824 and 826 may be similar to plurality of detectors 724. First beam splitter 832 and objective lens 834 may be similar to beam splitter 732 and objective lens 734, and each of segmented pupils 840 and 850 may be similar to segmented pupil 740.

In operation, a portion of a light beam, emitted by radiation source 822, is transmitted through first beam splitter 832, focused by objective lens 834 (to form an illumination spot S' on wafer 820), returned by wafer 820, focused again by objective lens 834, and reflected off of first beam splitter 832, essentially as described above with respect to system 700. The portion of the returned light beam reflected off of first beam splitter 832 travels towards second beam splitter 836, and is partitioned thereby into two light beams of different polarization (e.g. s-polarized light and p-polarized light): a first polarized light beam and a second polarized light beam. The first polarized light beam travels towards first segmented pupil 840 and first plurality of detectors 824, and the second polarized light beam travels towards second segmented pupil 850 and second plurality of detectors 826 (so that, per combination of pupil segment and polarization, a detector is allocated).

Arrows indicating the trajectories of light rays emitted by radiation source 822 are not numbered.

Scan data analysis module 804 is configured to receive scan data from detectors 824 and detectors 826, and based on the scan data, determine whether a scanned region includes one or more defects, essentially as described with respect to scan data analysis module 604 of system 600. Scan data from each of first detectors 824a to 824i may be used to generate difference images $J_1$ to $J_9$, respectively, each in a different perspective. Scan data from each of second detectors 826a to 826i may be used to generate difference images $J_{10}$ to $J_{18}$, respectively, each in a different perspective (and in a different polarization to difference images $J_1$ to $J_9$). Thus, per pair of polar and azimuthal angles characterizing a light ray returned from wafer 820, two difference images in two different perspectives may be obtained: A first difference image corresponding to the first polarization, and a second polarization corresponding to the second polarization.

Since in FIG. 8, each of segmented pupils 840 and 850 is depicted as including nine pupil segments, to each of which corresponds a detector from detectors 824 and detectors 826, respectively, the number of perspectives is eighteen. The set of difference values associated with a first "pixel" on the wafer therefore includes 18×(N'+1) elements (difference values), where N' is the number of neighboring pixels taken into account. When the number of neighboring pixels, for example, is eight, the set of difference values includes 162 elements. (The predetermined kernel also includes 162 elements). The covariance matrix is then a 162×162 matrix.

Figure 9:
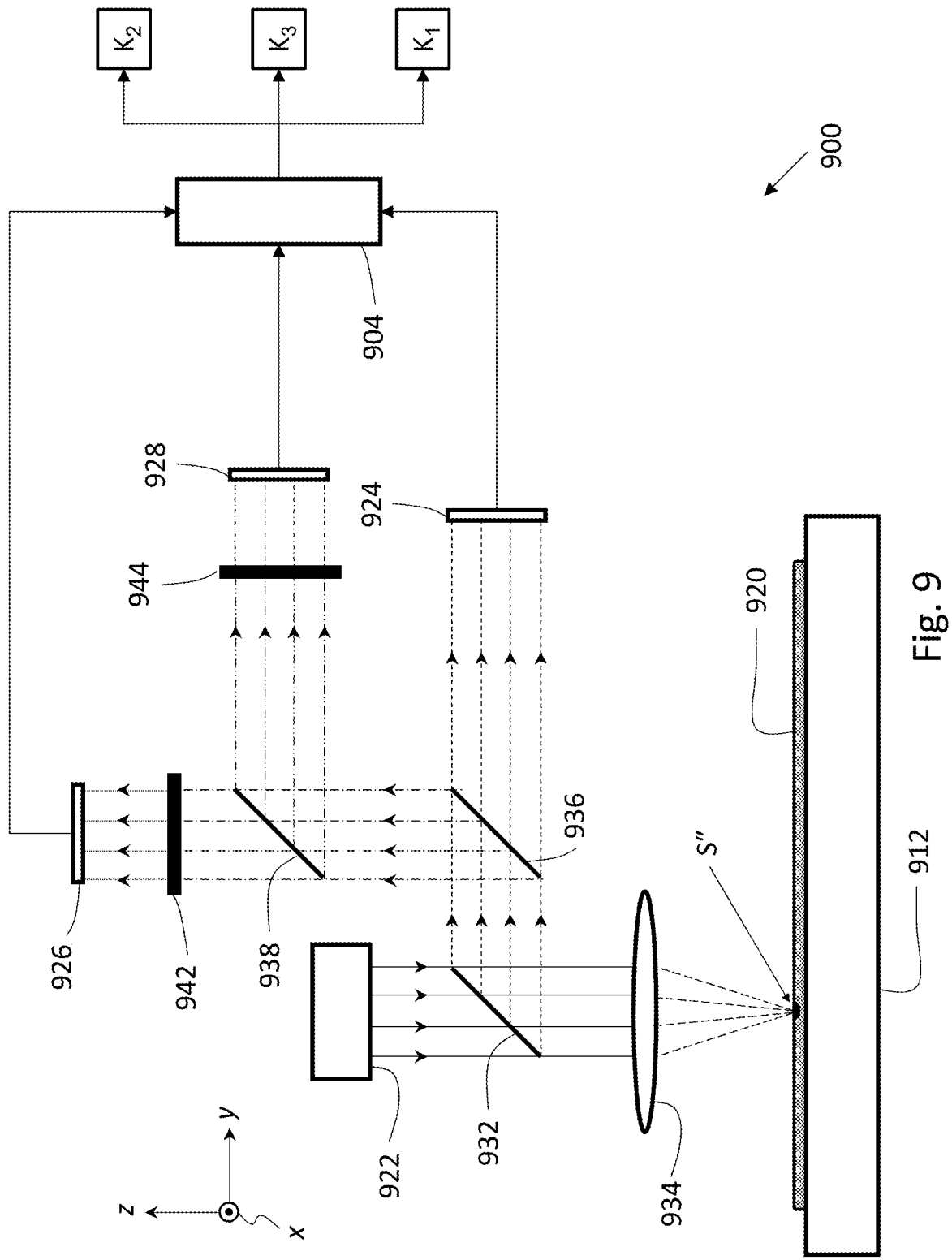
FIG. 9 schematically depicts a computerized system for obtaining and analyzing multi-perspective scan data of a wafer (also depicted), the depicted computerized system is a specific embodiment of the computerized system of FIG. 6.

FIG. 9 schematically depicts a computerized system 900, which is a specific embodiment of system 600. System 900 includes a radiation source 922, a first detector 924, a second detector 926, and a third detector 928, which together constitute (or form part of) an imager, which is a specific embodiment of imager 616 of system 600. System 900 further includes a scan data analysis module 904, which is a specific embodiment of scan data analysis module 604 of system 600. System 900 further includes a first beam splitter 932, an objective lens 934, a second beam splitter 936, a third beam splitter 938, a first polarizer 942, and a second polarizer 944, which together constitute (or form part of) optical equipment, which is a specific embodiment of optical equipment 618 of system 600. (Non-segmented) pupils before each of detectors 924, 926, and 928, are not shown. Also shown are a stage 912 (which is a specific embodiment of stage 612 of system 600) and a wafer 920 placed thereon.

First polarizer 942 is positioned before second detector 926 and second polarizer 944 is positioned before third detector 928. First polarizer 942 is configured to filter through light of a first polarization, and second polarizer 944 is configured to filter through light of a second polarization, which is different from the first polarization.

In operation, a portion of a light beam, emitted by radiation source 922, is transmitted through first beam splitter 932, focused by objective lens 934 (to form an illumination spot S" on wafer 920), returned by wafer 920, focused again by objective lens 934, and reflected off of first beam splitter 932, essentially as described above with respect to system 700. The portion of the returned light beam reflected off of first beam splitter 932 travels towards second beam splitter 936, and is partitioned thereby into a first returned sub-beam and a second returned sub-beam. The first returned sub-beam constitutes the portion of the returned light beam which is transmitted via second beam splitter 936. The second returned sub-beam constitutes the portion of the returned light beam which is reflected by second beam splitter 936.

The first returned sub-beam travels towards first detector 924 and is sensed thereby. The second returned sub-beam travels towards third beam splitter 938 and is partitioned thereby into a transmitted portion and a reflected portion. The transmitted portion travels towards first polarizer 942 and the reflected portion travels towards second polarizer 944. Polarizers 942 and 944 may be aligned at different angles, such that each of second detector 926 and third detector 928 sense light of different polarizations. Detectors 924, 926, and 928 may thus be configured to provide readings sufficient to fully characterize the polarization of the returned light beam (reflected off of wafer 920).

Arrows indicating the trajectories of light rays emitted by radiation source 922 are not numbered.

Scan data analysis module 904 is configured to receive scan data from detectors 924, 926 and 928, and based on the scan data, determine whether a scanned region includes one or more defects, essentially as described with respect to scan data analysis module 604 of system 600. Scan data from each of detectors 924, 926, and 928 may be used to generate difference images $K_1$, $K_2$, and $K_3$, respectively, each in a different perspective.

Since, unlike the pupils of system 700 and 800, the pupils (not shown) of system 900 are not segmented, the number of perspectives is three (one per detector). The set of difference values associated with a first "pixel" on the wafer therefore includes 3×(N"+1) elements (difference values), where N" is the number of neighboring pixels taken into account. When the number of neighboring pixels, for example, is eight, the set of difference values includes 27 elements. (The predetermined kernel also includes 27 elements). The covariance matrix is then a 27×27 matrix.

It is noted that, according to some embodiments, a single polarizing beam splitter may be substituted for the combination of third beam splitter 938 and first polarizer 942 and second polarizer 944.

Simulation Results

This subsection describes results of simulations demonstrating the efficacy of the above-described methods (e.g.

method 100) and systems. FIG. 10A presents multi-perspective scan data obtained by simulating a computerized system, such as system 700. The multi-perspective scan data include nine images (enumerated by Roman numerals I to IX)—each in a different perspective—of a square region of a (simulated) wafer. The region was taken to be uniform except for a deformity (as may be introduced by a dust particle) in the center of the region (i.e. at a central pixel). The dimensions of the region were set to 1 µm². Each of images I to IX is an intensity image corresponding to a different collection angle (as may be obtained by means of a segmented pupil, such as segment pupil 740). Also indicated is an intensity scale ranging from black, which corresponds to zero (I=0) or minimum intensity, to white, which corresponds to a maximum intensity reading (I=$I_{max}$) or above.

In each of images I to IX, the intensity of the central pixels generally varies from one pixel to the next and, moreover, appears neither brighter nor dimmer on average than the surrounding pixels. In other words, the defect is not apparent to the naked eye in any of the images, even when the images are viewed together, side-by-side.

As explained above, a pixel may be determined as being defective when the quantity $s_{ij}$, wherein $s_{ij}=k^{ij} \cdot ((C^{ij})^{-1} v^{ij})$ and the indices i and j label the pixel (i and j respectively denote the row and column of the pixel), is greater than a corresponding threshold. Here, $v^{ij}$ is the first vector corresponding to the (i,j)-th pixel, $C^{ij}$ is the covariance matrix corresponding to the (i,j)-th pixel, and $k^{ij}$ is the third vector (the kernel) corresponding to the (i,j)-th pixel.

Figures 10B, 10C:
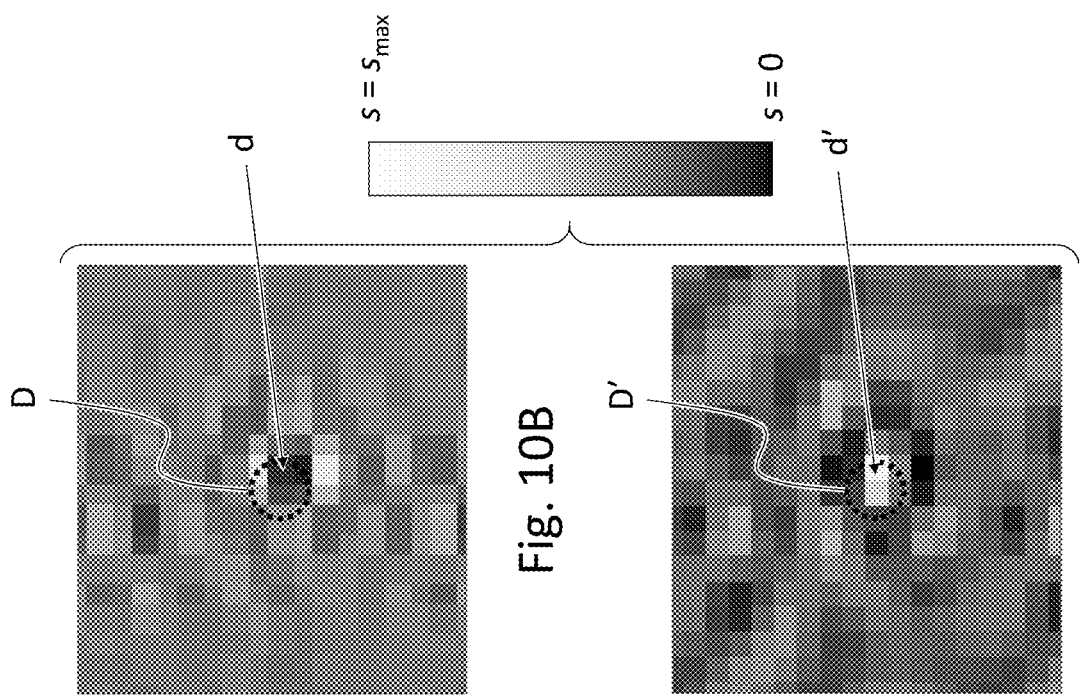
FIGS. 10A-10C presents simulation results demonstrating the efficacy of the method of FIG. 1.
Figure 10A:
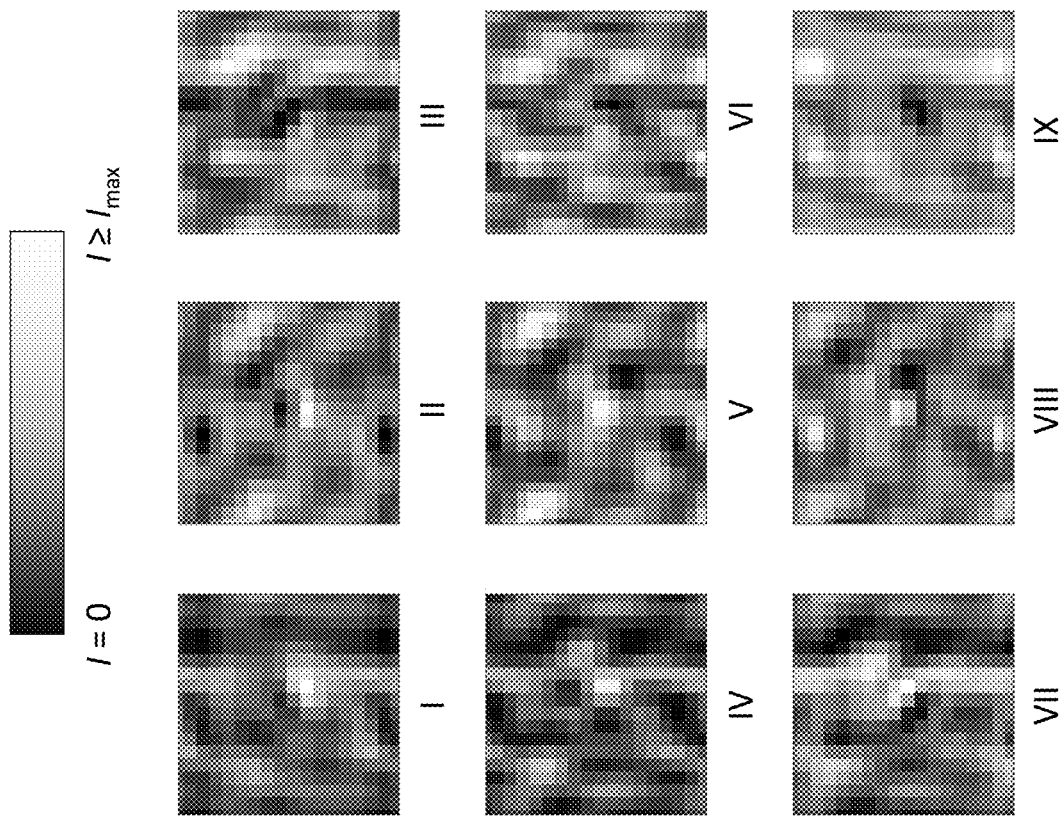

FIG. 10B is a graphical representation of the $s_{ij}$ corresponding to the simulated region, when the cross-perspective covariances are not taken into account. This effectively amounts to setting to zero the off-diagonal blocks of the $C^{ij}$. The $s_{ij}$ are arranged in a square array in accordance with the values assumed by i and j. (It is noted that since, according to the "bare design" thereof, the simulated region is intended to be uniform, the threshold B may be taken to be the same for all the pixels and no extra information is be gained by subtracting B from the $s_{ij}$) Also indicated is a scale of $s=k \cdot (C^{-1}v)$, ranging from black, which corresponds to $s=s_{min}$, to white, which corresponds to $s=s_{max}$.

FIG. 10C is a graphical representation of the $s_{ij}$ corresponding to the simulated region, when the cross-perspective covariances are taken into account (i.e. all the components of the $C^{ij}$ are computed).

A dashed circle D is drawn around the central pixel (which corresponds to the defective pixel) in FIG. 10B, with the central pixel being indicated by an arrow d. A dashed circle D' is drawn around the central pixel in FIG. 10C. with the central pixel being indicated by an arrow d'. As is readily seen, the central pixel appears much brighter in FIG. 10C than in FIG. 10B, i.e. the defect signal is much stronger in FIG. 10C than in FIG. 10B, demonstrating the improved defect detection capacity of the disclosed methods. Taking the cross-perspective covariances into account, increased the signal-to-noise ratio from 0.7 to 2.2.

According to an aspect of some embodiments, there is provided a method for obtaining information about a region of a sample (e.g. a wafer). The method includes:

Obtaining, by an imager, multiple images of the region. The multiple images may differ from each other by at least one parameter selected out of illumination spectrum, collection spectrum, illumination polarization, collection polarization, angle of illumination, angle of collection, and sensing type (e.g. intensity, phase, polarization). The obtaining of the multiple images includes illuminating (irradiating) the region and collecting radiation from the region. The region includes multiple region pixels (i.e. the region includes a plurality of sub-regions, each of which being of a size corresponding to a pixel).

Receiving or generating multiple reference images.

Generating, by an image processor (e.g. a scan data analysis module), multiple difference images that represent differences between the multiple images and the multiple reference images.

Calculating a set of region pixel attributes (a set of pixel values) for each region pixel (i.e. each pixel in the region) of the multiple region pixels. The calculating is based on pixels of the multiple difference images.

Calculating a set of noise attributes, based on multiple sets of region pixels attributes of the multiple region pixels (i.e. based on sets of pixel values corresponding to each of the multiple region pixels). Note that the covariance matrix (and its inverse) is a set of numbers characterizing statistical properties of the noise. Those statistical properties can generally be referred to as "attributes". The use of the covariance matrix as statistical properties is a specific non-limiting embodiment.

Determining for each region pixel whether the region pixel represents a defect based on a relationship between the set of noise attributes and the set of region pixel attributes of the pixel.

According to some embodiments of the method, the determining of whether the region pixel represents a defect is also responsive to a set of attributes of an actual defect.

According to some embodiments of the method, the determining of whether the region pixel represents a defect is also responsive to a set of attributes of an estimated defect.

According to some embodiments of the method, the method includes calculating the set of noise attributes by calculating a covariance matrix.

According to some embodiments of the method, the calculating of the covariance matrix includes: calculating, for each region pixel, a set of covariance values that represent the covariance between different attributes (i.e. between different perspectives) of the set of region pixel attributes of the region pixel, and calculating the given covariance matrix based on multiple sets of covariance values of the multiple region pixels.

According to some embodiments of the method, after calculating the covariance matrix, the inverse of the covariance matrix is used for further calculations. The inverse of the covariance matrix is multiplied with a set of attributes representing the defect of interest (instead of the noise).

According to some embodiments of the method, the method further includes determining, for each region pixel, whether the region pixel represents a defect by comparing, to a threshold (e.g. the threshold B), a product of a multiplication between (i) a set of attributes of the region pixel (e.g. the first vector v), (ii) an inverse of the covariance matrix (e.g. the matrix $C^{-1}$) corresponding to the noise afflicting the set of attributes of the region pixel, and (iii) a set of attributes of the defect of interest.

According to some embodiments of the method, the set of pixel attributes of a region pixel includes data regarding the region pixel and neighboring region pixels of the region pixel.

According to some embodiments of the method (e.g. as shown in FIGS. 7A and 8), the imager includes multiple detectors for generating the multiple images, and the method further includes allocating different detectors to detect radiation from different pupil segments of the multiple pupil segments (of a segmented pupil).

According to some embodiments of the method, the different pupil segments of the multiple pupil segments exceed four pupil segments.

According to some embodiments of the method (e.g. as shown in FIG. 8), the imager includes multiple detectors for generating the multiple images, and the method further includes allocating different detectors to detect radiation from different combinations of (a) polarization and (b) different pupil segments of the multiple pupil segments.

According to some embodiments of the method, the method includes obtaining the multiple images at a same point in time.

According to some embodiments of the method, the method includes obtaining the multiple images at different points in time.

According to some embodiments of the method, the method further includes classifying the defect.

According to some embodiments of the method, the method further includes determining whether the defect is a defect of interest or not a defect of interest.

According to an aspect of some embodiments, there is provided a computerized system for obtaining information about a region of a sample (e.g. an area on a wafer). The system includes an imager that includes optics and an image processor. The imager is configured to obtain multiple images of the region. The multiple images may differ from each other by at least one parameter selected out of illumination spectrum, collection spectrum, illumination polarization, collection polarization, angle of illumination, and angle of collection. The obtaining of the multiple images includes illuminating the region and collecting radiation from the region. The region includes multiple region pixels. The computerized system is configured to receive or generate multiple reference images. The image processor is configured to:

Generate multiple difference images that represent differences between the multiple images and the multiple reference images.

Calculate a set of region pixel attributes for each region pixel of the multiple region pixels. The set of region pixel attributes are calculated based on pixels of the multiple difference images.

Calculate a set of noise attributes, based on multiple sets of region pixels attributes of the multiple region pixels.

Determine, for each region pixel, whether the region pixel represents a defect, based on a relationship between the set of noise attributes and the set of region pixel attributes of the pixel.

According to an aspect of some embodiments, there is provided a non-transitory computer-readable medium that stores instructions that cause a computerized system to:

Obtain, by an imager of a computerized system (as described above), multiple images of a region of an object (e.g. an area on a wafer). The multiple images differ from each other by at least one parameter selected out of illumination spectrum, collection spectrum, illumination polarization, collection polarization, angle of illumination, angle of collection, and sensing type. The obtaining of the multiple images includes illuminating the region and collecting radiation from the region. The region includes multiple region pixels.

Receive or generate multiple reference images.

Generate, by an image processor of the computerized system, multiple difference images that represent differences between the multiple images and the multiple reference images.

Calculate a set of region pixel attributes for each region pixel of the multiple region pixels, wherein the calculating is based on pixels of the multiple difference images.

Calculate a set of noise attributes, based on multiple sets of region pixels attributes of the multiple region pixels.

Determine, for each region pixel, whether the region pixel represents a defect, based on a relationship between the set of noise attributes and the set of region pixel attributes of the pixel.

While the disclosure has focused on scanning and inspection of wafers, it will be clear to the skilled person that the disclosed methods and systems are applicable also for detecting irregularities in the optical masks used in wafer fabrication ("mask inspection").

As used herein, according to some embodiments, the terms "collection channel" and "detection channel" may be used interchangeably. According to some embodiments, the notation "Vdata", "Cov", and "Vdefect" may be used to indicate the first vector v, the covariance matrix C, and the third vector k, respectively.

As used herein, according to some embodiments, the term "group" may refer not only to pluralities of elements (e.g. components, features) but also to single elements. In the latter case, the group may be referred to as a "single-member group".

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although operations of methods according to some embodiments may be described in a specific sequence, methods of the disclosure may include some or all of the described operations carried out in a different order. A method of the disclosure may include a few of the operations described or all of the operations described. No particular operation in a disclosed method is to be considered an essential operation of that method, unless explicitly specified as such.

Although the disclosure is described in conjunction with specific embodiments thereof, it is evident that numerous alternatives, modifications and variations that are apparent to those skilled in the art may exist. Accordingly, the disclosure embraces all such alternatives, modifications and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

What is claimed is:

1. A method for detecting defects on a sample, the method comprising:
obtaining scan data of a first region of a sample in a multiplicity of perspectives; and
performing an integrated analysis of the obtained scan data, the integrated analysis comprising:
computing, based on the obtained scan data, cross-perspective covariances; and
determining presence of defects in the first region, taking into account the cross-perspective covariances, wherein determining the presence of the defects in the first region further comprises:
for each of a plurality of sub-regions of the first region, generating difference values in each of the multiplicity of perspectives based on the obtained scan data and corresponding reference data of the first region in each of the multiplicity of perspectives; and
determining whether each of the plurality of sub-regions is defective, based at least on the difference values corresponding to the sub-region and to sub-regions neighboring the sub-region, and noise values corresponding to the sub-region and to the neighboring sub-regions, the noise values comprising corresponding covariances from the cross-perspective covariances.

2. The method of claim 1, wherein the sample is a patterned wafer.

3. The method of claim 1, wherein the multiplicity of perspectives comprises two or more of an incidence angle(s) of an irradiating beam(s), a collection angle(s) of a collected beam(s), at least one intensity of the irradiating beam(s), and at least one intensity of the collected beam(s), and compatible combinations thereof.

4. The method of claim 1, wherein the method is optical-based and wherein the multiplicity of perspectives comprises two or more of an illumination angle(s), an intensity of an illuminating radiation, an illumination polarization, an illumination wavefront, an illumination spectrum, one or more focus offsets of an illuminating light beam, a collection angle(s), an intensity of a collected radiation, a collection polarization, a phase of a collected beam(s), brightfield channel, grayfield channel, Fourier filtering of returned light, and a sensing type selected from intensity, phase, or polarization, and compatible combinations thereof.

5. The method of claim 1, further comprising generating difference images of the first region in each of the multiplicity of perspectives, based on the obtained scan data and the corresponding reference data, and wherein the difference values corresponding to each sub-region, from the plurality of sub-regions, are derived from, and/or characterize, sub-images of the difference images, which correspond to the sub-region.

6. The method of claim 1, wherein the noise values are computed based at least on the difference values.

7. The method of claim 1, wherein the determining of whether each of the plurality of sub-regions is defective comprises: generating a covariance matrix comprising the noise values corresponding to the sub-region and the sub-regions neighboring the sub-region; multiplying a first vector, comprising the difference values corresponding to the sub-region and the neighboring sub-regions, by an inverse of the covariance matrix, to obtain a second vector; computing a scalar product of the second vector and a third vector, whose components include values characterizing a defect; and labeling the sub-region as defective if the scalar product is greater than a predetermined threshold.

8. The method of claim 1, wherein at least one of the plurality of sub-regions is of a size corresponding to a single pixel.

9. The method of claim 1, wherein the cross-perspective covariances are computed based at least on scan data obtained in a preliminary scanning of the sample wherein regions of the sample are sampled, each sampled region being representative of a group of regions of the sample, with at least one of the sampled regions being representative of the first region.

10. The method of claim 1, further comprising, when a presence of a defect is determined, determining whether the defect is a defect of interest and, optionally, when the defect is determined to be of interest, classifying the defect.

11. The method of claim 1, repeated with respect to each of a plurality of additional regions, such as to scan a greater region of the sample formed by the first region and the additional regions.

12. A computerized system for obtaining and analyzing multi-perspective scan data of a sample, the system comprising:
scanning equipment configured to scan a region of a sample in a multiplicity of perspectives; and
a scan data analysis module configured to perform an integrated analysis of scan data obtained in the scan, the integrated analysis comprising:
computing, based on the obtained scan data, cross-perspective covariances; and
determining presence of defects in the region, taking into account the cross-perspective covariances, wherein determining the presence of the defects in the region further comprises:
for each of a plurality of sub-regions of the region, generating difference values in each of the multiplicity of perspectives based on the obtained scan data and corresponding reference data of the region in each of the multiplicity of perspectives; and
determining whether each of the plurality of sub-regions is defective, based at least on the difference values corresponding to the sub-region and to sub-regions neighboring the sub-region, and noise values corresponding to the sub-region and to the neighboring sub-regions, the noise values comprising corresponding covariances from the cross-perspective covariances.

13. The system of claim 12, wherein the scanning equipment comprises an optical-based imager, and wherein the multiplicity of perspectives comprises two or more of an illumination angle(s), an intensity of an illuminating radiation, an illumination polarization, an illumination wavefront, an illumination spectrum, one or more focus offsets of an illuminating light beam, a collection angle(s), an intensity of a collected radiation, a collection polarization, a phase of a collected beam(s), brightfield channel, grayfield channel, Fourier filtering of returned light, and a sensing type selected from intensity, phase, or polarization, and compatible combinations thereof.

14. The system of claim 12, wherein the scan data analysis module is further configured to generate difference images of the region in each of the multiplicity of perspectives based on the obtained scan data and the corresponding reference data, and wherein the difference values corresponding to each sub-region, from the plurality of sub-regions, are derived from, and/or characterize, sub-images of the difference images, which correspond to the sub-region.

15. The system of claim 12, wherein the determining of whether each of the plurality of sub-regions is defective comprises: generating a covariance matrix comprising the noise values corresponding to the sub-region and the sub-regions neighboring the sub-region; multiplying a first vector, comprising the difference values corresponding to the sub-region and the neighboring sub-regions, by an inverse of the covariance matrix, to obtain a second vector; computing a scalar product of the second vector and a third vector, whose components include values characterizing a defect; and labeling the sub-region as defective if the scalar product is greater than a predetermined threshold.

16. A non-transitory computer-readable storage medium storing instructions that cause a sample analysis system to:
scan a region of a sample in a multiplicity of perspectives; and
perform an integrated analysis of scan data obtained in the scan, the integrated analysis comprising:
computing, based on the obtained scan data, cross-perspective covariances; and
determining presence of defects in the region, taking into account the cross-perspective covariances, wherein determining the presence of the defects in the region further comprises:
for each of a plurality of sub-regions of the region, generating difference values in each of the multiplicity of perspectives based on the obtained scan data and corresponding reference data of the region in each of the multiplicity of perspectives; and
determining whether each of the plurality of sub-regions is defective, based at least on the difference values corresponding to the sub-region and to sub-regions neighboring the sub-region, and noise values corresponding to the sub-region and to the neighboring sub-regions, the noise values comprising corresponding covariances from the cross-perspective covariances.

17. The storage medium of claim 16, wherein the multiplicity of perspectives comprises two or more of an illumination angle(s), an intensity of an illuminating radiation, an illumination polarization, an illumination wavefront, an illumination spectrum, one or more focus offsets of an illuminating light beam, a collection angle(s), an intensity of a collected radiation, a collection polarization, a phase of a collected beam(s), brightfield channel, grayfield channel, Fourier filtering of returned light, and a sensing type selected from intensity, phase, or polarization, and compatible combinations thereof.

* * * * *